US012402698B1

(12) United States Patent
Vasquez et al.

(10) Patent No.: US 12,402,698 B1
(45) Date of Patent: Sep. 2, 2025

(54) ELECTRONIC NECKLACE COMPRISING A PROJECTOR MEDALLION AND METHOD OF FORMATION THEREOF

(71) Applicants: Robert Vasquez, Gilbert, AZ (US); Yanbei Qin, Ningbo (CN)

(72) Inventors: Robert Vasquez, Gilbert, AZ (US); Yanbei Qin, Ningbo (CN)

( * ) Notice: Subject to any disclaimer, the term of this patent is extended or adjusted under 35 U.S.C. 154(b) by 0 days.

(21) Appl. No.: 18/761,910

(22) Filed: Jul. 2, 2024

(51) Int. Cl.

| | |
|---|---|
| ***A44C 15/00*** | (2006.01) |
| ***F21L 4/02*** | (2006.01) |
| ***F21V 5/00*** | (2018.01) |
| ***F21V 23/00*** | (2015.01) |
| ***F21V 23/06*** | (2006.01) |
| ***F21V 33/00*** | (2006.01) |

(Continued)

(52) U.S. Cl.
CPC ........ *A44C 15/005* (2013.01); *A44C 15/0015* (2013.01); *F21L 4/02* (2013.01); *F21V 5/006* (2013.01); *F21V 23/001* (2013.01); *F21V 23/005* (2013.01); *F21V 23/06* (2013.01); *F21V 33/0008* (2013.01); *F21V 2200/40* (2015.01); *F21W 2111/023* (2013.01); *F21W 2121/06* (2013.01); *F21Y 2103/10* (2016.08); *F21Y 2113/20* (2016.08); *F21Y 2115/10* (2016.08)

(58) Field of Classification Search
CPC ..... A44C 15/005; A44C 15/0015; F21L 4/02; F21V 5/006; F21V 23/001; F21V 23/005; F21V 23/06; F21V 33/0008
See application file for complete search history.

(56) References Cited

U.S. PATENT DOCUMENTS

| | | | |
|---|---|---|---|
| 4,061,910 | A | 12/1977 | Rosenfeld |
| 4,096,552 | A | 6/1978 | Ben-Porat |

(Continued)

FOREIGN PATENT DOCUMENTS

| | | | |
|---|---|---|---|
| CN | 106418933 | A | 2/2017 |
| CN | 106539208 | A | 3/2017 |

(Continued)

OTHER PUBLICATIONS

"The Electric Mammoth LED Halloween Large Candy Corn Necklaces", by The Electric Mammoth, Published Online on [Aug. 8, 2023] https://m.media-amazon.com/images/I/61R+VgccvNL._SY695_.jpg.

(Continued)

*Primary Examiner* — Mary Ellen Bowman
(74) *Attorney, Agent, or Firm* — LEGALFORCE RAPC WORLDWIDE

(57) ABSTRACT

An electronic necklace comprising a projector medallion and associated methods of formation are described, and more particularly to an electronic necklace with one power source for powering a projector medallion and necklace bulbs and its associated methods of formation. In one embodiment, an apparatus may include a wire serving as a necklace strand with a projector medallion formed of a translucent material including a backside, a front side, an underside, and/or an interior. The necklace may include a power source in the form of a battery. The necklace may include a projector light and/or a medallion light within the interior of the projector medallion. The necklace may include a control chip within the interior of the projector medallion that may distribute power from the battery to the wire, the projector light, and/or the medallion light.

24 Claims, 16 Drawing Sheets

(51) Int. Cl.
*F21W 111/023* (2006.01)
*F21W 121/06* (2006.01)
*F21Y 103/10* (2016.01)
*F21Y 113/20* (2016.01)
*F21Y 115/10* (2016.01)

(56) References Cited

U.S. PATENT DOCUMENTS

| | | | |
|---|---|---|---|
| 4,101,955 A | 7/1978 | Dunah | |
| 4,170,036 A | 10/1979 | Sussel | |
| 4,262,324 A | 4/1981 | Murphy | |
| 4,309,743 A | 1/1982 | Martin | |
| 4,779,172 A | 10/1988 | Jimenez et al. | |
| 4,894,757 A | 1/1990 | Frusha et al. | |
| 5,201,578 A | 4/1993 | Westmoland | |
| 5,477,433 A | 12/1995 | Ohlund | |
| 5,497,307 A | 3/1996 | Bae et al. | |
| 5,876,109 A | 3/1999 | Scalco | |
| 6,233,971 B1 | 5/2001 | Ohlund | |
| 6,578,981 B2 | 6/2003 | Jackson et al. | |
| 6,833,539 B1 | 12/2004 | Maeda | |
| 7,036,962 B2 | 5/2006 | Chan | |
| 7,070,292 B2 | 7/2006 | Kamara et al. | |
| 7,213,935 B2 | 5/2007 | Lee | |
| 7,244,045 B2 | 7/2007 | Schrimmer et al. | |
| 7,367,684 B2 | 5/2008 | D'Souza | |
| 7,393,113 B2 | 7/2008 | Damrau | |
| 7,441,917 B1 | 10/2008 | Underdown et al. | |
| 8,142,061 B2 | 3/2012 | Jablonski | |
| 9,332,812 B2 | 5/2016 | Ma | |
| 9,933,150 B2 | 4/2018 | Korenek et al. | |
| D817,212 S | 5/2018 | Qin | |
| 10,064,461 B2 | 9/2018 | Roos | |
| D838,620 S | 1/2019 | Qin | |
| D842,159 S | 3/2019 | Qin | |
| D842,749 S | 3/2019 | Qin | |
| 10,299,025 B2 | 5/2019 | Sakai et al. | |
| 11,134,759 B2 | 10/2021 | Keeler et al. | |
| 11,337,495 B2 | 5/2022 | Buck | |
| 11,553,768 B2 | 1/2023 | See | |
| 2003/0167795 A1 | 9/2003 | Metcalfe et al. | |
| 2004/0136179 A1 | 7/2004 | Lewis et al. | |
| 2004/0196650 A1 | 10/2004 | Phlippeau | |
| 2005/0174800 A1 | 8/2005 | Clegg | |
| 2007/0153497 A1 | 7/2007 | Chang | |
| 2007/0153499 A1 | 7/2007 | Church et al. | |
| 2012/0118014 A1 | 5/2012 | King et al. | |
| 2014/0230487 A1 | 8/2014 | Vasquez et al. | |
| 2015/0009654 A1 | 1/2015 | Chan et al. | |
| 2015/0135768 A1* | 5/2015 | Barrick | B23D 61/185 63/1.12 |
| 2015/0164188 A1 | 6/2015 | Gelfand et al. | |
| 2015/0223576 A1 | 8/2015 | Vora | |
| 2015/0316698 A1 | 11/2015 | Resnick et al. | |
| 2017/0280838 A1* | 10/2017 | Gray | A44C 11/00 |
| 2017/0343888 A1 | 11/2017 | Raskin et al. | |
| 2018/0008019 A1 | 1/2018 | Qin | |
| 2018/0303209 A1 | 10/2018 | McGraw | |
| 2019/0014872 A1* | 1/2019 | Finn | A44C 15/0005 |
| 2019/0142118 A1 | 5/2019 | Torres | |
| 2020/0022469 A1 | 1/2020 | Alstrom | |
| 2021/0401130 A1* | 12/2021 | Jane | A44C 25/001 |

FOREIGN PATENT DOCUMENTS

| | | |
|---|---|---|
| EP | 3210489 A1 | 8/2017 |
| WO | 2003037133 A2 | 5/2003 |

OTHER PUBLICATIONS

"AMOR Present 2PCS Christmas Light Up Necklaces", by AMOR Present, Published Online on [Oct. 9, 2022] https://m.media-amazon.com/images/I/61cUlqTvzPL._SY695_.jpg.

"LED Light Up Skull Necklace", by Party Glowz, Found Online on [Sep. 12, 2022] https://www.partyglowz.com/cdn/shop/products/ezgif.com-gif-maker_3.gif?v=1622813788.

"LED Light Up Yellow Ducks Bead Necklace", by Party Glowz, Found Online on [Sep. 12, 2022] https://www.partyglowz.com/cdn/shop/products/duck.gif?v=1618594998.

"JEAIRTS Halloween Light Up Necklaces Led Pumpkin Skull Necklace with Bracelet Glowing Halloween Party Favors Trick or Treat Decorations", by JEAIRTS, Found Online on [Sep. 12, 2022] https://images-cdn.ubuy.co.in/66e174d76599f64bac07de12-jeairts-halloween-light-up-necklaces-led.jpg.

"VIHOSE 4 Set Halloween LED Light Up Necklace Headband Glitter Skull Party Accessories Glow Party Favor for Halloween", by VIHOSE, Found Online on [Sep. 12, 2022] https://images-cdn.ubuy.co.in/66e174ed32ea4e5565267748-vihose-4-set-halloween-led-light-up.jpg.

"Disney Mickey Mouse Glow Necklace", by Disney store, Found Online on [Sep. 12, 2022] https://target.scene7.com/is/image/Target/GUEST_518dbcce-cfd1-4604-9543-cd9d947def3b?wid=1200&hei=1200&qlt=80&fmt=webp.

"Easter Necklace Accessories", by EOBOH, Found Online on [Sep. 12, 2022] https://m.media-amazon.com/images/I/61cUlqTvzPL._SY695_.jpg.

"Liliful 18 Pcs LED Light Up Christmas Bulb Necklace", by Liliful, Published Online on [Sep. 28, 2023] https://m.media-amazon.com/images/I/71sf6-DtOsL._SY695_.jpg.

"FUTUREPLUSX light up christmas tree necklace", by FUTUREPLUSX, Published Online on [Oct. 27, 2023] https://m.media-amazon.com/images/I/61uwd1HAV-L._SY695_.jpg.

"TG,LLC Treasure Gurus Light Up Red White Blue Star Flashing LED Bulb Necklace Glowing Novelty Party Favor", by TG, LLC, Published Online on [Mar. 19, 2020] https://m.media-amazon.com/images/I/51rkNqtNVpL._SX679_.jpg.

"Light up Flashing Necklace Toys for Kids, Glow in the Dark LED Light Bulbs for Adults", by Amarlozn, Published Online on [Oct. 10, 2021] https://m.media-amazon.com/images/I/61wOqkLRtBL._SX679_.jpg.

"LED Light Up Emoji-Icon Necklace", by Windy City Novelties, Published Online on [Sep. 22, 2017] https://m.media-amazon.com/images/I/71vytttA/7L._SX679_.jpg.

"Mushroom Necklace—LED Light up Mushroom Pendant Necklace—Glow Mushroom Necklace", by Eternity LED Glow, Published Online on [Jun. 8, 2017] https://m.media-amazon.com/images/I/91Xr9s1TfjL._AC_SX522_.jpg.

"MCPINKY 36-inch length Light-Up Christmas Tree Necklace, Flashing LED Indoor Christmas Light Necklace Decor for Adults Kids Christmas Ugly Sweater", by MCPINKY, Published Online on [Aug. 3, 2024] https://m.media-amazon.com/images/I/61c6vkHNpCL._SX679_.jpg.

"TURNMEON 16Pcs 4th of July Party Favor, American Star 4 Light Up Necklaces", by TURNMEON, Published Online on [May 29, 2024] https://m.media-amazon.com/images/I/81PcPI7muTL._SX679_.jpg.

"Flashing Crystal Star Necklaces, LED Light Up Jewelry for Halloween & Parties", by TERRIFI, Published Online On [Nov. 21, 2023] https://m.media-amazon.com/images/I/714K6T6PpOL._SY695_.jpg.

"Leitee 12 Pcs Light up Pacifier Necklace Glowing Flashing LED Pacifier Glow in the Dark Pacifier Rave Toys for Adults Little Teens Birthday Carnival Concert", by Leitee, Published Online on [Mar. 31, 2023] https://m.media-amazon.com/images/I/81k8kvHDoHL._SY695_.jpg.

"The Electric Mammoth LED Christmas Necklace ", by The Electric Mammoth, Published Online on [May 21, 2023] https://m.media-amazon.com/images/I/81iWWF-UpML._SY695_.jpg.

"Light-Up Glow Choker™—Handmade EL Wire Necklace", by ZMadMaskerConcepts, Found Online on [Sep. 12, 2022] https://i.etsystatic.com/13304087/r/il/8e7bfc/4086765972/il_794xN.4086765972_aqqq.jpg.

"Halloween Lights—24 Pack Halloween LED Necklace", by Maifei, Published Online on [Aug. 12, 2020] https://m.media-amazon.com/images/I/71j5u55qAaL._SX679_.jpg.

(56) References Cited

OTHER PUBLICATIONS

"Funpa 8PCS Led Necklace Creative Assorted Decor Light up Necklace Party Favor for Kids", by Funpa, Published Online on [Jul. 19, 2019] https://m.media-amazon.com/images/I/61dZTcCEZAL._SX679_.jpg.
"Flashing Crystal Star Necklaces", by Yunsailing, Published Online on [Sep. 7, 2023] https://m.media-amazon.com/images/I/71gOneUD6vL._SY695_.jpg.

* cited by examiner

ELECTRONIC NECKLACE COMPRISING A PROJECTOR MEDALLION AND METHOD OF FORMATION THEREOF

FIELD OF TECHNOLOGY

An electronic necklace comprising a projector medallion and associated methods of formation are described, and more particularly to an electronic necklace with one power source for powering a projector medallion and necklace bulbs and its associated methods of formation.

BACKGROUND

A holiday necklace may be designed to stylize a wearer with designs related to a relevant cultural event, sporting event, personal event, and/or holiday. Some holidays, including but not limited to Halloween and New Years, may have increased night-time vehicle and foot traffic on residential roads. A wearer, including but not limited to a child, may be excited and therefore may not always pay attention to his/her surroundings. The child may not know and/or ignore a rule about road safety (e.g., such as looking both ways before crossing a residential street, using designated crosswalks, and staying on sidewalks).

The child's visibility on the residential street may be limited as caused by poor lighting. Insufficient and/or inadequate lighting on the residential street may make it difficult for a driver to see the child, especially during the darker evening hours of Halloween. Dimly lit areas, broken streetlights, and/or areas without streetlights altogether can create visibility challenges for both the driver and the child.

Moreover, keeping with a ghoulish theme of the Halloween holiday, the child may wear a costume and/or clothing that is dark in color. This can decrease visibility, and the child may blend into a surrounding, making it harder for the driver to spot the child. This is particularly problematic at Halloween night when there may be limited ambient light.

Obstructions including but not limited to parked cars, overgrown vegetation, and/or other obstacles near sidewalks can obstruct the view of the child, reducing visibility and increasing the risk of accidents with the driver. The child and the driver on the residential street may be distracted because of noises, people, costumes, and/or festivities during holiday nights. The driver may be distracted (eg, using their phone and/or engaged in other activities while behind a wheel). Therefore, the driver may not see the child.

The driver may be traveling at a high speed on the residential street and may have reduced reaction time and may not have enough time to spot and avoid the child, particularly in poorly lit areas or when there are obstructions during Halloween. Adverse weather conditions during the late fall day of Halloween including but not limited to rain, fog, and/or snow can further reduce visibility for both the child and the driver, making it more challenging to see and be seen.

As groups of people participate in festivities and move about a neighborhood, a front yard and/or carnival in darkened conditions, the child may be subjected to numerous risks including trips and falls and traffic accidents. Walkways and crowded areas may be difficult for the child to see and perceive because of a lack of light and/or costuming that may be visually obstructive, leading to inadvertent tripping and/or other walking accidents. Likewise, walking along and/or crossing roadways may be dangerous because of lack of light and/or dark costuming that makes the child difficult to see to drivers, leading to avoidable traffic accidents and injury.

Therefore, the child may be hurt by the driver.

SUMMARY

Disclosed is an electronic necklace with a projector medallion and associated methods of formation. Other features will be apparent from the accompanying drawings and from the detailed description that follows.

In one aspect an apparatus includes a wire serving as a necklace strand and a projector medallion formed of a translucent material comprising a backside, a front side, an underside, and an interior. The projector medallion is connected to the necklace strand. The apparatus includes a power source in the form of a battery within the interior of the projector medallion and a projector light within the interior of the projector medallion. The apparatus includes a control chip within the interior of the projector medallion that controls power from the battery to the projector light.

The apparatus includes an optical conduit within the interior of the projector medallion comprising an emblem lens and a refraction means designed to manipulate the light emanating from the projector light. The projector light is at least partially encased within the optical conduit to allow light to travel through a light canal within the optical conduit and pass through the emblem lens and the refraction means. The refraction means is at an end of the optical conduit and is adjacent to the underside of the projector medallion. The emblem lens is within the optical conduit and is positioned to receive light from the projector light.

The apparatus includes an emblem integrated onto the emblem lens and an opening of the projector medallion cut into the projector medallion. The refraction means is adjacent to the opening and the optical conduit and the opening are substantially planar to one another. The opening allows light to project from the projector light to an area exterior to the refraction means without being obstructed by the translucent material of the projector medallion.

The apparatus may include a medallion light within the interior of the projector medallion. The medallion light may emit light through the translucent material of the projector medallion to the area exterior to the projector medallion. The apparatus may further include a wire connector that may be designed for mechanically and/or electrically connecting the wire to the projector medallion via the control chip, which may thereby facilitate the transmission of power from the control chip to the wire while ensuring the wire's integration into the electrical system of the apparatus.

The apparatus may further include a projector light connector that may provide both mechanical support and/or electrical connection for the projector light to the control chip, which may enable power transfer from the control chip to the projector light and may ensure the projector light is securely positioned within the interior of the projector medallion. The apparatus may further include a medallion light connector that may provide both mechanical support and/or electrical connection for the medallion light to the control chip, which may enable power transfer from the control chip to the medallion light and/or may ensure the medallion light is securely positioned within the interior of the projector medallion.

The apparatus may further include a securing bracket that may be attached to the optical conduit and may at least partially secure the optical conduit within the interior of the projector medallion by at least partially affixing the optical conduit to the projector light connector. The apparatus may further include a proximal support, a medial support, and/or a distal support attached to a backside interior of the projector medallion which may support the optical conduit at an oblique angle to the backside interior. The proximal support may be shorter than the medial support. The medial support may be shorter than the distal support. The medial support may comprise a medial cutout to receive and/or support the optical conduit. The medial support may be closer to the underside of the projector medallion than the proximal support. The distal support may be closer to the underside of the projector medallion than the medial support and/or the proximal support. The distal support may comprise a distal cutout to receive and/or support the optical conduit.

The apparatus may further include a plurality of necklace LEDs that may be attached to the wire. The plurality of necklace LEDs may receive power from the battery via the wire connector and/or the wire. The optical conduit may be polyhedral in shape. The optical conduit may be cylindrical in shape. Furthermore, when the light travels through the light canal, the light may pass through the emblem lens and/or may be at least partially obstructed by the emblem which may create a decorative projection to the area exterior to the projector medallion after passing through the refraction means.

In yet another aspect, an apparatus includes a wire serving as a necklace strand and a projector medallion formed of a translucent material comprising a backside, a front side, an underside, and an interior. The projector medallion is substantially connected to the wire. The apparatus further includes a battery compartment within the interior of the medallion and a battery serving as a power source within the battery compartment. The apparatus further includes a control chip within the interior of the projector medallion that is electrically connected to the battery and controls power to a plurality of projector lights. The plurality of projector lights are positioned within the interior.

The apparatus further includes a plurality of projector light connectors that connect the plurality of projector lights to the control chip of the projector medallion and allows for power to move from the battery to the control chip and then to the plurality of projector lights. The plurality of projector light connectors support the plurality of projector lights within the interior. The apparatus further includes a wire connector that connects the wire to the projector medallion via the control chip. The wire connector allows for power to move from the battery to the control chip and then to the wire. The apparatus further includes a plurality of optical conduits within the interior, each of which comprising a light canal, an emblem lens, and a refraction means. Each individual optical conduit houses at least one of the plurality projector lights.

The apparatus further includes an emblem integrated onto each emblem lens. When the light travels through the light canal of the plurality of optical conduits, the light passes through the emblem lens and is at least partially obstructed by the emblem creating a decorative projection at an area exterior to the projector medallion after passing through the refraction means. The apparatus further includes a plurality of openings of the projector medallion on at least one of the front side of the projector medallion and the underside of the projector medallion. Each individual refraction means is adjacent to at least one of the openings. Each individual optical conduit of the plurality of optical conduits is substantially planar to one of the plurality of openings. Each of the plurality of openings allow light to project from the plurality of projector lights to the area exterior to the projector medallion without being obstructed by the translucent material of the projector medallion.

The apparatus may include a medallion light that may be positioned within the interior and/or emits light through the translucent material of the projector medallion to the area exterior to the projector medallion. The medallion light may be electrically connected to the battery. The apparatus may further include a medallion light connector that may connect the medallion light to the control chip of the projector medallion and/or may allow for power to move from the battery to the control chip and then to the medallion light. The medallion light connector may support the medallion light within the interior.

The apparatus may further include a plurality of necklace LEDs that may be attached to the wire. The plurality of necklace LEDs may be electrically connected to the battery via the necklace strand. The apparatus may further include a securing bracket attached to the plurality of optical conduits that may at least partially secure the plurality of optical conduits within the interior by at least partially affixing the plurality of optical conduits to the plurality of projector light connectors. The apparatus may further include a plurality of proximal supports, a plurality of medial supports, and/or a plurality of distal supports that may be attached to a backside interior of the projector medallion to support the plurality of optical conduits at an angle oblique to the backside interior.

The plurality of proximal supports may be shorter than the plurality of medial supports and/or may be closer to the battery compartment than the plurality of medial supports. The plurality of medial supports may be shorter than the plurality of distal supports and/or may be closer to the battery compartment than the plurality of distal supports. Each of the plurality of medial supports may comprise a medial cutout to receive and/or support at least one of the plurality of optical conduits. The plurality of distal supports may be closer to the underside of the projector medallion than the plurality of medial supports and/or the plurality of proximal supports. The plurality of medial supports may be closer to the underside of the projector medallion than the plurality of proximal supports. Each of the plurality of distal supports may comprise a distal cutout to receive and/or support at least one of the plurality of optical conduits.

The apparatus may further include a plurality of necklace LEDs attached to the wire. The necklace LEDs may receive power from the battery via the control chip which may then direct power to the wire connector which may be electrically connected to the wire. The apparatus may further include a plurality of necklace bulbs that may encase the necklace LEDs, the necklace bulbs may further comprise a bulb interior and the bulb interior may further comprise an LED mount. The plurality of necklace bulbs may be formed from the translucent material. One of the plurality of necklace LEDs may be affixed within the bulb interior of one of the plurality of necklace bulbs via the LED mount. The plurality of necklace LEDs may project light through the necklace bulbs to the area exterior to the bulb.

In yet another aspect, a method of manufacturing an apparatus includes forming a necklace strand from a wire. The wire is capable of transmitting an electrical current. The method includes attaching a projector medallion formed of a translucent material to the necklace strand. The projector medallion comprises a backside, a front side, an underside, and an interior and the backside comprises a backside interior that faces the interior of the projector medallion. The method further includes connecting a battery compartment to the backside interior within the interior and placing a battery serving as a power source within the battery compartment. The battery is accessible through the backside. The method further includes electrically connecting a control chip to the battery. The control chip is within the interior of the projector medallion.

The method further includes securing the control chip to a chip mount within the interior. The chip mount is attached to the backside interior and is adjacent to the battery compartment. The control chip controls power from the battery to a projector light and the projector light is positioned within the interior of the medallion. The method further includes mounting the projector light to a projector light connector that connects the projector light to the control chip of the projector medallion and allows for power to move from the battery to the control chip and then to the projector light. The projector light connector supports the projector light within the interior The method further includes bridging the wire connector to the control chip via a wire connector. The wire connector mounts the wire to the projector medallion at the control chip to form the necklace strand and the wire connector allows for power to move from the battery to the control chip and then to the wire. The method further includes placing an optical conduit within the interior. The optical conduit comprises a light canal, an emblem lens, and a refraction means and the optical conduit is at least one of polyhedral in shape and cylindrical in shape. The projector light is at least partially encased within the optical conduit and light from the projector light travels through the light canal of the optical conduit and passes through the emblem lens and the refraction means to an area exterior to the refraction means. The refraction means is at an end of the optical conduit and is adjacent to the underside of the projector medallion and the emblem lens is within the optical conduit at an area less close to the end of the optical conduit than the refraction means.

The method further includes attaching a proximal support, a medial support, and a distal support, to the backside interior of the projector medallion to support the optical conduit at an oblique angle to the backside interior. The proximal support is shorter than the medial support and the medial support is shorter than the distal support. The medial support comprises a medial cutout to receive and support the optical conduit and the medial support is closer to the underside of the projector medallion than the proximal support. The distal support is closer to the underside of the projector medallion than the medial support and the proximal support and the distal support comprises a distal cutout to receive and support the optical conduit.

The method further includes integrating an emblem onto the emblem lens. When the light travels through the light canal, the light passes through the emblem lens and is at least partially obstructed by the emblem creating a decorative projection at the area exterior to the projector medallion after passing through the refraction means. The method further includes cutting an opening into the projector medallion on at least one of the front side of the projector medallion and the underside of the projector medallion. The refraction means is adjacent to the opening and the optical conduit and the opening are substantially planar to one another. The opening of the projector medallion is a shape that substantially corresponds to the shape of the end of optical conduit and the refraction means, and the opening allows light to project from the projector light to an area exterior to the projector medallion without being obstructed by the translucent material of the projector medallion.

The method may further include attaching a securing bracket to the optical conduit that may at least partially secure the optical conduit within the interior by at least partially affixing the optical conduit to the projector light connector. The method may further include attaching a plurality of necklace LEDs to the wire. The necklace LEDs may receive power from the battery via the wire connector and/or the wire. The method may further include encasing the necklace LEDs into the plurality of necklace bulbs, the necklace bulbs may further comprise a bulb interior, the bulb interior may further comprise an LED mount. The plurality of necklace bulbs may be formed from the translucent material. One of the plurality of necklace LEDs may be affixed within the bulb interior of one of the plurality of necklace bulbs via the LED mount. The plurality of necklace LEDs may project light through the necklace bulbs to the area exterior to the bulb.

The method may further include mounting a medallion light to a medallion light connector that may connect the medallion light to the control chip of the projector medallion and/or may allow for power to move from the battery to the control chip and then to the medallion light. The medallion light connector may support the medallion light within the interior.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

An electronic necklace comprising a projector medallion and associated methods of formation are described, and more particularly to an electronic necklace comprising one or more projectors with the projector medallion and its associated methods of use.

Figure 1:
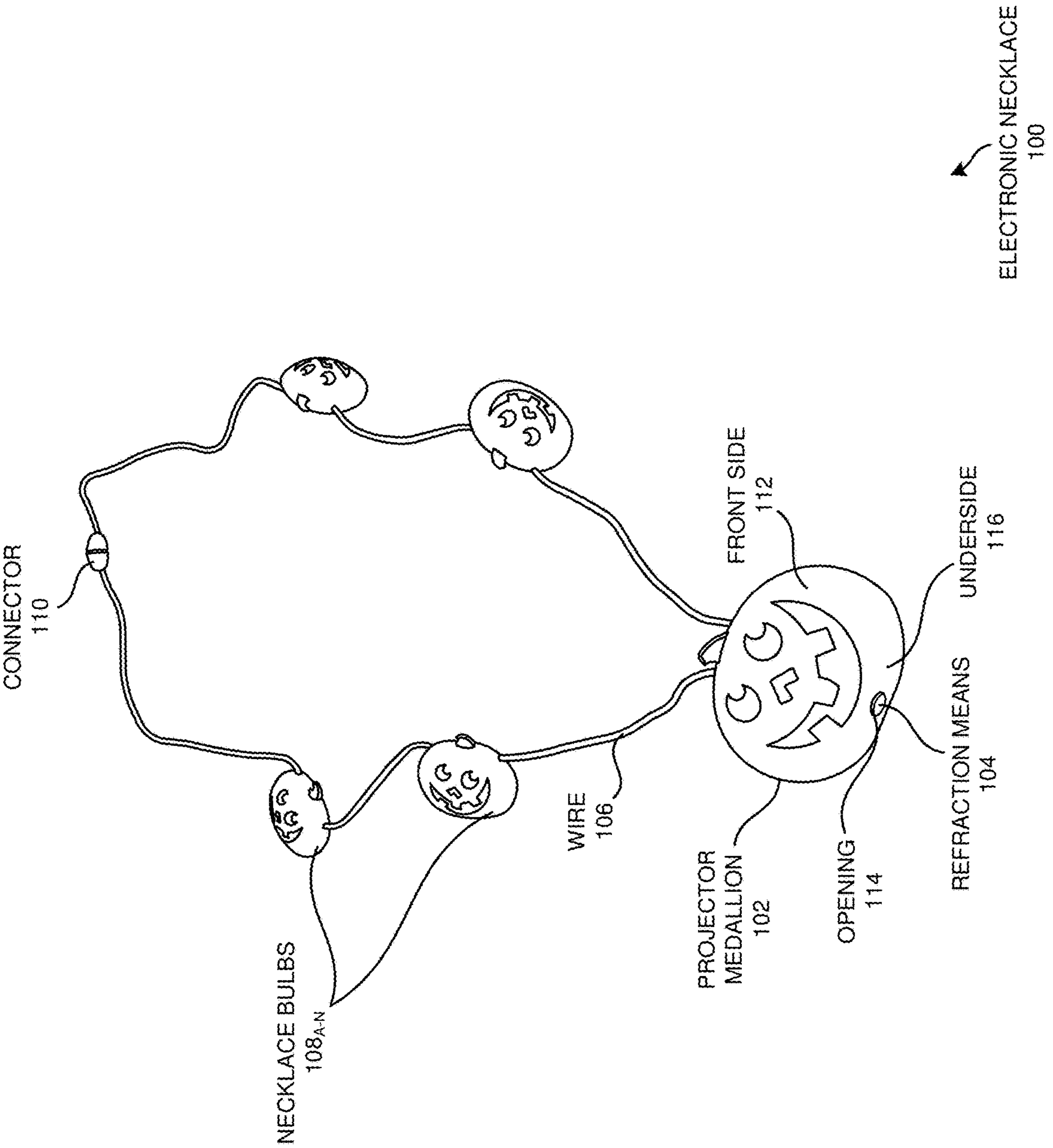
FIG. 1 is a schematic view of an electronic necklace comprising a projector medallion, according to one embodiment.

FIG. 1 is a schematic view of an electronic necklace 100 comprising a projector medallion 102, according to one embodiment. FIG. 1 illustrates the electronic necklace 100 comprising a projector medallion 102, a refraction means 104, a wire 106, a plurality of necklace bulbs 108A-N, a connector 110, a front side 112, an opening 114, and an underside 116.

The electronic necklace 100 may be a necklace strand which may comprise the wire 106 which may further comprise electronics components for illumination. The electronic necklace 100 may be a decorative, wearable lighting accessory that combines jewelry styling with integrated illumination electronics. The electronic necklace 100 may comprise a chain-like strand with multiple necklace bulbs 108A-N distributed along its length. The electronic necklace 100 may produce dynamic, eye-catching decorative lighting effects and/or patterns that are projected outwards, particularly from the front of the projector medallion 102.

The projector medallion 102 may be a central ornamental piece that attaches to the wire 106 of the electronic necklace 100. The projector medallion 102 may comprise electronic components and/or projection means to create a decorative projection 702 (not shown). The projector medallion 102 may comprise metal, plastic, glass, and/or other materials and may have an exterior emblem and/or design. The projector medallion 102 may serve not only as a decorative item but may also house various components including but not limited to LEDs, a power source, and/or a projection system. The internal structure of the projector medallion 102 may be engineered to enable light projection and/or display.

The refraction means 104 may be an optical element including but not limited to a lens and/or prism. The refraction means 104 may be positioned to refract and/or direct light from within the projector medallion 102 to project the light. The refraction means 104 may work by altering the path of light emitted from one or more LED which may enable the projector medallion 102 to project patterns and/or symbols externally. The refraction means 104 may bend and/or spread the light to create a wider and/or more diffuse ornamental projection. The refraction means 104 may be made of glass, acrylic, and/or transparent plastic. The refraction means 104 may be attached to the optical conduit 404 (not shown).

The wire 106 may serve as a necklace strand and/or may allow a user to wear the electronic necklace 100. The wire 106 may be an electrical conduit to deliver power and/or signals to the various components of the electronic necklace 100. The wire 106 may connect the projector medallion 102 to each of the necklace bulbs 108A-N and/or carry electricity to illuminate the necklace bulbs 108A-N. The wire 106 may also transmit control signals to coordinate blinking patterns and/or lighting effects. The wire 106 may be thin, flexible, and/or durable. The design of the wire 106 may be aesthetically pleasing which may complement the overall look of the electronic necklace 100.

The plurality of necklace bulbs 108A-N may be individual lighting elements and/or illuminated ornaments spaced out at intervals along the length of the wire 106 of the electronic necklace 100. Each bulb of the plurality of necklace bulbs 108A-N may comprise a necklace LED 604 (not shown) positioned inside the bulb interior 602 (not shown). The necklace LED 604 may be illuminated by receiving power and/or signals through the wire 106. The necklace bulbs 108A-N may produce a decorative lighting effect that runs the length of the electronic necklace 100. The numbers and/or spacing of the plurality of necklace bulbs 108A-N may allow varied lighting patterns and/or effects.

The connector 110 may be a clasp, hook, magnet, and/or other type of fastening mechanism which may allow the two ends of the electronic necklace 100 to be reversibly secured together and/or worn around the neck of the user 704 (not shown). The connector 110 may be connected to the wire 106 at each end to complete the circuitry running through the length of the electronic necklace 100. The connector 110 may enable the electronic necklace 100 to form a continuous loop when worn while still being detachable for easy removal. The connector 110 may secure the electronic necklace 100 in place during use.

The front side 112 may be the outward-facing frontal surface of the projector medallion 102. The front side 112 may comprise various sub-regions including but not limited to the underside 116. The front side 112 may comprise a decorative symbol and/or contoured shapes for producing lighting effects. The front side 112 may comprise one or more refraction means 104 and/or opening 114. Various decorative emblems, patterns, and/or displays that light up may be exhibited on this front side 112. The front side 112 may be an ornamental surface meant to showcase the illumination capabilities of the electronic necklace 100.

The opening 114 may be an aperture and/or port that penetrates through the underside 116 of the front side 112 of the projector medallion 102. The opening 114 may be substantially adjacent to the refraction means 104 and/or may allow light to emanate from the projector medallion 102 to an area exterior to the projector medallion 102.

The underside 116 may be the exterior bottom surface of the projector medallion 102. The underside 116 may face substantially downward and/or toward the ground when the electronic necklace 100 is worn by the user. The underside 116 may comprise the opening 114 and/or the refraction means 104. The underside 116 may provide a structural base to mount internal components like LEDs, wiring connections, supports, and/or the optical conduit 404. The underside 116 may attach to the backside 200 (not shown) to enclose the inner cavity of the projector medallion 102.

According to one embodiment, FIG. 1 shows the electronic necklace 100 which may comprise the wire 106 which may serve as a necklace strand. The wire 106 may close to form a necklace-like loop by the connector 110. The electronic necklace 100 may further comprise one or more necklace bulbs 108A-N. The necklace bulbs 108A-N may be attached to the wire 106. The electronic necklace 100 may comprise the projector medallion 102. The projector medallion 102 may be formed of a translucent material. The projector medallion 102 may be formed in a decorative shape. The decorative shape of the projector medallion 102 may be the same as at least one of the necklace bulbs 108A-N. The projector medallion 102 may be connected to the wire 106 (e.g. the necklace strand) by various means including but not limited to a hook-and-loop, a snap, a clip, a screw, and/or an adhesive.

The projector medallion 102 may comprise a backside 200 (not shown), the front side 112, an underside 116, and/or an interior 400 (not shown). The front side 112 may be attached to the backside 200 and/or the underside 116. The front side 112 and/or the underside 116 may be commonly formed through a single mold process. The refraction means 104 may be on and/or adjacent to the front side 112 and/or the underside 116. The front side 112 may comprise a decorative illustration. The projector medallion's 102 shape and/or orientation may be similar to and/or the same as at least one of the necklace bulbs 108A-N. The projector medallion 102 may further comprise the opening 114 and/or the refraction means 104. The refraction means 104 may be substantially planar with the opening 114. The refraction means 104 and/or the opening 114 may be similarly shaped. The projector medallion 102 may further comprise a power source in the form of the battery 206 (not shown) within the interior 400 (not shown) of the projector medallion 102.

Figure 2:
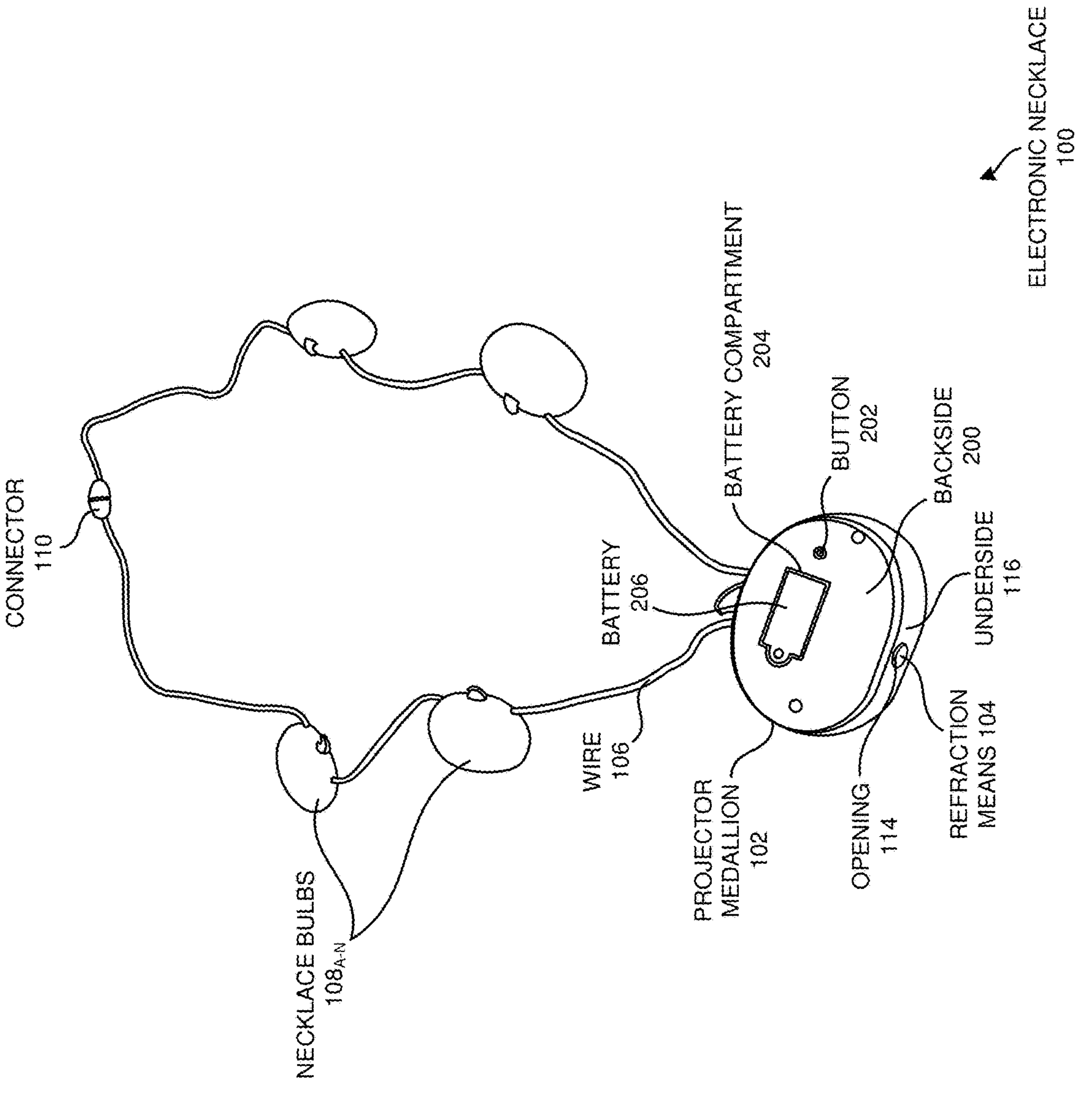
FIG. 2 is a rear view of the electronic necklace of FIG. 1 showing a backside of the projector medallion and the backside of the plurality of necklace bulbs, according to one embodiment.

FIG. 2 is a rear view of the electronic necklace 100 of FIG. 1 showing a backside 200 of the projector medallion 102 and the backside of the plurality of necklace bulbs 108A-N, according to one embodiment. FIG. 2 illustrates the electronic necklace 100 comprising the projector medallion 102, the refraction means 104, the wire 106, the plurality of necklace bulbs 108A-N, the connector 110, a backside 200, a button 202, a battery compartment 204, and a battery 206. The backside 200 may be the rear surface of the projector medallion 102 that faces towards the body of the user when the electronic necklace 100 may be worn. The backside 200 may comprise functional components and/or user interfaces that may control and/or power the electronic necklace 100.

The backside 200 may provide a surface to mount items including but not limited to the button 202, battery compartment 204, and/or opening 114 (not shown) for wiring access to the interior components of the projector medallion 102. The backside 200 may allow the decorative front of the electronic necklace 100 to remain unobstructed while giving the user easy access to operative parts of the electronic necklace 100. The backside 200 may be attached to the frontside 112 by various means including but not limited to adhesives, screws, clips, hook-and-loop, and or fasteners. The backside 200 and/or the frontside 112 may be commonly formed through a single old process.

The button 202 may be a user input control mounted on the backside 200 of the projector medallion 102. The button 202 may be a switch to control the function of the projector medallion 102 and/or the various components within the interior 400 (not shown). The button 202 may be a push-button switch, a slide switch, a toggle switch, a rocker switch, a dual in-line package switch, a tactile switch, a capacitive touch sensor, a proximity sensor, a rotary switch, and/or a soft power button.

By having the button 202 positioned on the backside 200, the button 202 is easily accessible to the wearer without obstructing the front decorative view. The button 202 may serve functions including but not limited to powering the electronic necklace 100 ON/OFF and/or cycling through different illumination modes and/or patterns displayed on the front side 112. The button 202 may send control signals to the control chip 416 (not shown). The button 202 may put the basic operation of the complex lighting effects directly at the user's fingertips on the backside 200. The button 202 may enable adjusting the lighting without having to remove the electronic necklace 100.

The battery compartment 204 may be a housing and/or cavity located on the backside 200 of the projector medallion 102 which may comprise the battery 206 (e.g. the power source for the electronic necklace 100). By positioning the battery compartment 204 on and/or within the backside 200, the battery 206 may be easily accessible to the user for swapping out depleted cells. The battery compartment 204 may be connected through wiring to power delivery components internally that distribute electricity to the LEDs, control chip 416 (not shown), and/or other powered elements. The battery compartment 204 may make the electronic necklace 100 portable by providing self-contained energy without tethering to an external power source. The location of the battery compartment 204 may prevent it from obstructing the ornamental front-side lighting effects. The battery compartment 204 may at least partially support the control chip 416 (not shown). The battery compartment 204 may be attached to the backside interior 402 (not shown).

The battery 206 may be a removable and/or replaceable power source which may be housed within the battery compartment 204 of the projector medallion 102. The battery 206 may supply the electrical energy required to illuminate the lighting components including but not limited to the projector light 406 (not shown), the medallion light 410 (not shown), and/or the necklace LEDs 604. The battery 206 may move power to the control chip 416 and/or other electronics within interior 400 of the projector medallion 102.

The battery 206 may allow the electronic necklace 100 to be fully portable and/or untethered by providing a self-contained electricity source that does not require plugging into an external power outlet and/or supply. The battery 206 may be depleted from powering the electronic necklace 100 and/or the user may open the battery compartment 204 access point on the backside 200 to replace the existing battery 206 with a replacement battery. The battery 206 may be an alkaline battery, a lithium ion battery, a lithium polymer battery, a silver oxide battery, a zinc carbon battery, a zinc-air battery, and/or a button cell battery.

According to one embodiment, FIG. 2 shows the rear portions of the various components of the electronic necklace 100. As shown in FIG. 2, the projector medallion 102 may comprise the backside 200. The backside 200 may be separably attached to the frontside 112 (not shown). The backside 200 may comprise the battery compartment 204 wherein the power source (e.g. the battery 206) may be placed. The backside 200 may further comprise the button 202 which may control the power output throughout the electronic necklace 100. The button 202 may be placed anywhere on the projector medallion 102. The battery 206 may be accessed through an opening and/or door on the battery compartment 204 of the backside 200 of the projector medallion 102 to swap it out with a replacement battery. The battery 206 may be integrated with the electronic components of the projector medallion 102 to provide the power source. The battery 206 may be connected to one or more of the necklace LEDs 604 of the necklace bulb 108A-N via the wire 106.

Figure 3:
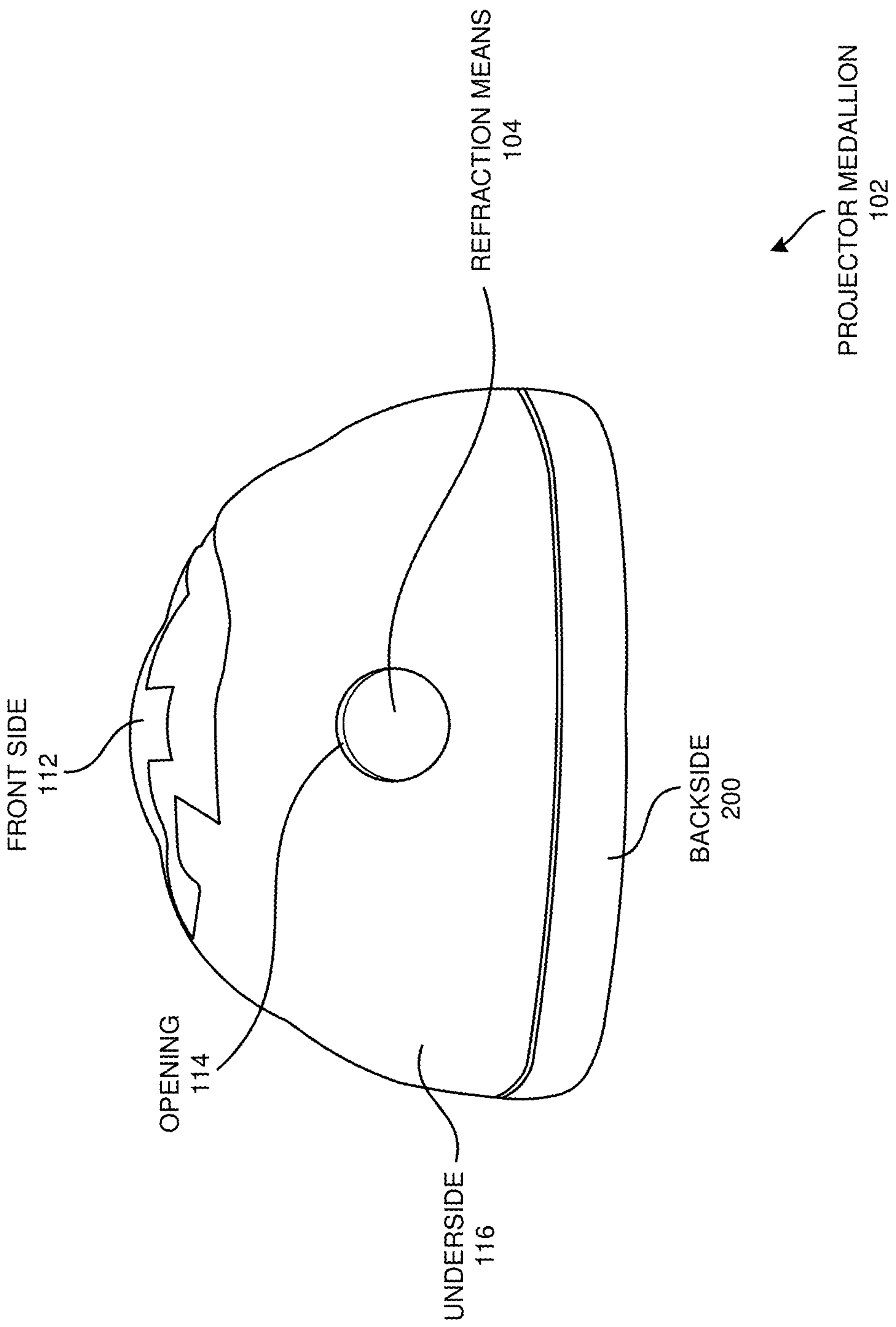
FIG. 3 is an underside view of the projector medallion of the electronic necklace of FIGS. 1 & 2, according to one embodiment.

FIG. 3 is an underside view of the projector medallion 102 of the electronic necklace 100 of FIGS. 1 & 2, according to one embodiment. FIG. 3 illustrates the projector medallion 102 comprising the backside 200, the refraction means 104, the front side 112, the underside 116, and the opening 114.

According to one embodiment, FIG. 3 shows the frontside 112 of the projector medallion 102 connected to the backside 200. The front side 112 may be connected to the backside 200 by various means including but not limited to glue, screws, magnets, and/or rivets. The underside 116 may be a subcomponent of the front side 112. The electronic necklace 100 may further comprise the opening 114 of the projector medallion 102 that may be cut into the translucent material of the projector medallion 102. The refraction means 104 may be adjacent to the opening 114. The opening 114 may be cut into underside 116 of the frontside 112. The opening 114 may be near and/or adjacent to the underside 116.

The optical conduit 404 (not shown) and/or the opening 114 may be substantially planar to one another. The opening 114 may allow light to project from the projector light 406 (not shown) to an area exterior to the projector medallion 102 without being obstructed by the translucent material of the projector medallion 102. The opening 114 of the projector medallion 102 may be a shape that substantially corresponds to the shape of the end 430 (not shown) of optical conduit 404 (not shown) and/or the refraction means 104.

Figure 4A:
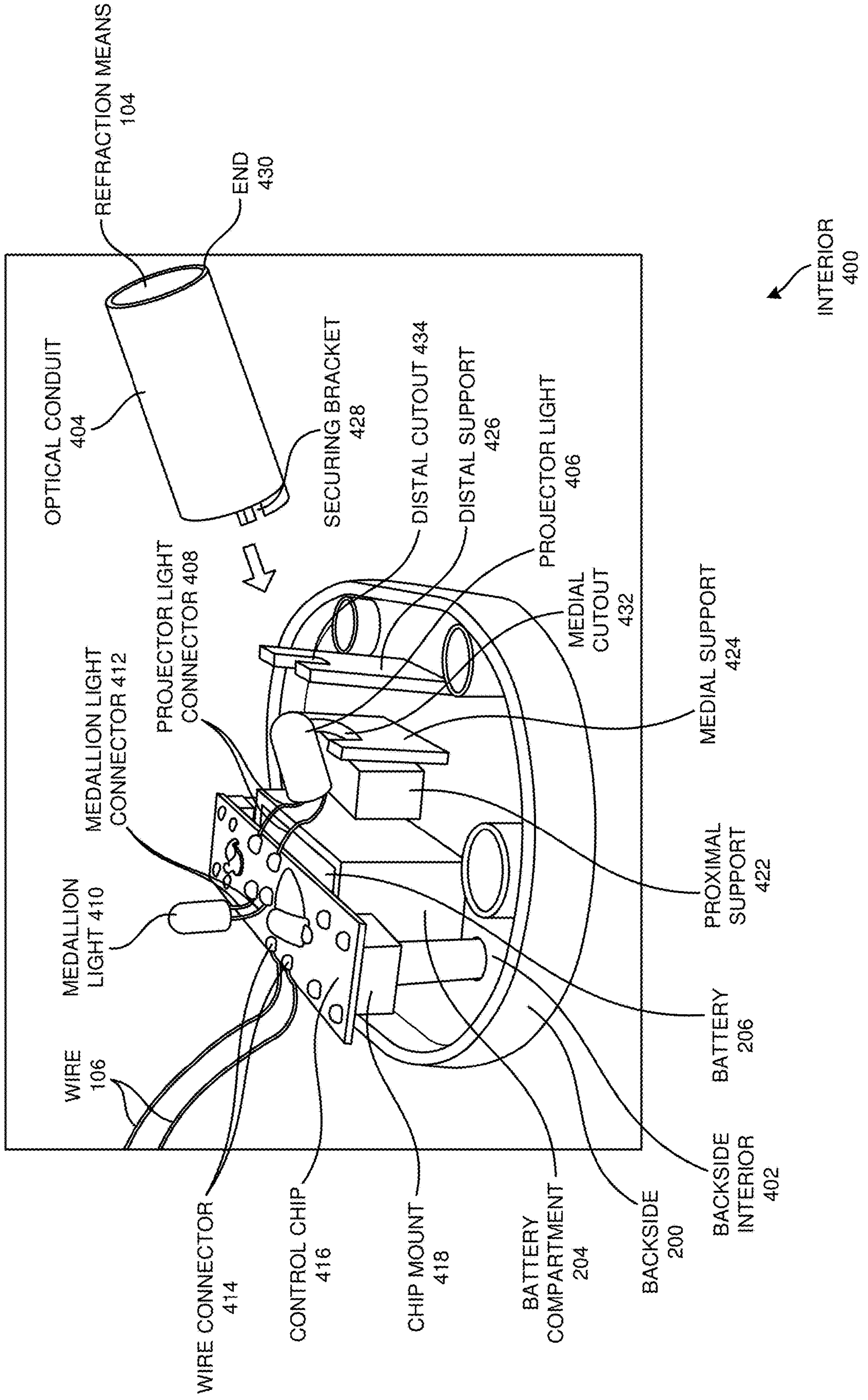
FIG. 4A is a disassembled view of the projector medallion of the electronic necklace of FIGS. 1-3 wherein the front side of the projector medallion is removed from the backside of the projector medallion and the internal components of an interior of the projector medallion are shown, according to one embodiment.

FIG. 4A is a disassembled view of the projector medallion 102 of the electronic necklace 100 of FIGS. 1-3 wherein the front side 112 of the projector medallion 102 is removed from the backside 200 of the projector medallion 102 and the internal components of an interior 400 of the projector medallion 102 are shown, according to one embodiment.

FIG. 4A illustrates an interior 400 of the electronic necklace 100 comprising the refraction means 104, the wire 106, the backside 200, the battery compartment 204, the battery 206, a backside interior 402, an optical conduit 404, a projector light 406, a projector light connector 408, a medallion light 410, a medallion light connector 412, a wire connector 414, a control chip 416, a chip mount 418, a proximal support 422, a medial support 424, a distal support 426, a securing bracket 428, an end 430, a medial cutout 432, and a distal cutout 434.

The interior 400 may be the hollow inner cavity and/or space within the projector medallion 102 which may house the various electronic components that produce the decorative lighting effects. The interior 400 may provide room to mount items including but not limited the projector light 406, the medallion light 410, wiring connections, the control chip 416, the battery compartment 204, and/or structural/component supports. The interior 400 may be an enclosed environment that protects the sensitive illumination hardware which may allow all the pieces to be integrated together. The backside interior 402 may be the inner-facing portion of the backside 200. The backside interior 402 may connect and/or support the various components of the interior 400.

The optical conduit 404 may be an elongated component that extends towards the front side 112 of the projector medallion 102. The optical conduit 404 may be cylindrical, cuboid, and/or any other polyhedron shape. The optical conduit 404 may house the projector light 406, the refraction means 104, the emblem lens 504, and/or other emblems and visual elements. The optical conduit 404 may emit light that travels through the length of the optical conduit 404. The optical conduit 404 may use mirrors, diffusers, and/or other optics to shape the light into decorative patterns and/or images before being projected out through the refraction means 104. The optical conduit 404 may turn point light sources into dynamic displays visible on the front 112 of the electronic necklace 100.

The projector light 406 may be one of the potentially multiple light-emitting diodes installed within the interior 400 of the projector medallion 102. The projector light 406 may connect to circuitry to receive power and/or control signals through the projector light connector 408. The projector light 406 may be through-hole LEDs, surface mount device (SMD) LEDs, high-power LEDs, RGB LEDs, ultraviolet LEDs, organic LEDs, chip-on-board LEDs filament LEDs, LED strips, miniature LEDs, and/or ceramic LEDs. The projector light 406 may project light through the optical conduit 404, the emblem lens 504 (not shown), and/or the refraction means 104 and thus produce a decorative projection 702 (not shown).

The projector light connector 408 may be one or more wiring terminals, sockets and/or other interfaces that the projector light 406 may attach with to integrate the projector light 406 with the control chip 416. The projector light connector 408 may supply electrical power to the projector light 406. The projector light connector 408 may relay control signals that may instruct the projector light 406 when to illuminate, change colors, brightness, and/or patterns based on the operating mode. The projector light connector 408 may facilitate the flexible positioning of the projector light 406 within the electronic necklace 100.

The medallion light 410 may be an additional light-emitting diode positioned within the interior 400 of the projector medallion 102. The medallion light 410 may serve as an illumination source for producing projection effects through the front side 112, the backside 200, and/or the underside 116. The medallion light 410 may create patterns, color mixing, and/or other dynamic lighting.

The medallion light connector 412 may be one or more wiring terminals, sockets and/or other interfaces that the medallion light connector 412 may attach with to integrate the medallion light 412 with the control chip 416. The medallion light connector 412 may connect the medallion light 410 to the control chip 416 of the projector medallion 102 and may allow for power to move from the battery 206 to the control chip 416 and then to the medallion light 410. The medallion light connector 412 may facilitate the flexible positioning of the medallion light 410 within the electronic necklace 100. The medallion light 410 may be through-hole LEDs, surface mount device (SMD) LEDs, high-power LEDs, RGB LEDs, ultraviolet LEDs, organic LEDs, chip-on-board LEDs filament LEDs, LED strips, miniature LEDs, and/or ceramic LEDs.

The medallion light connector 412 may supply power to the medallion light 410 and may also relay control signals about illumination patterns, colors, and/or brightness. Having separate connectors, including but not limited to the medallion light connector 412 for the medallion light 410 and the projector light connector 408 for the projector light 406 may allow each LED to be operated independently which may facilitate the creation of more dynamic and/or vivid visual effects through the execution of distinct lighting commands for each LED in the electronic necklace 100. The medallion light connector 412 may support the medallion light 410 within the interior 400. The wire connector 414 may allow power and/or control signals to flow between the control chip 416 and the necklace LEDs 604 (not shown) of the necklace bulbs 108A-N of the electronic necklace 100.

The control chip 416 may be a microcontroller, integrated circuit, and/or dedicated processor which may manage and/or coordinate all the various lighting elements and/or effects produced by the electronic components of the necklace 100. The control chip 416 may allow for all of the lighting components to be powered by a single power source by receiving power from a power source and/or distributing the power to the various components of the necklace 100. The control chip 416 may facilitate functions including but not limited to controlling power the projector light 406, the medallion light 410, and/or the necklace LEDs 604 (not shown), controlling the color and/or brightness of the projector light 406, the medallion light 410, and/or the necklace LEDs 604, and executing illumination patterns and/or sequences of the projector light 406, the medallion light 410, and/or the necklace LEDs 604. The control chip 416 may synchronize the different components to choreograph the complete decorative lighting experience. The control chip 416 may receive input from user controls and/or translate them into dynamic lighting shows through programmed operating modes.

The chip mount 418 may be one or more of a socket, post, pin, soldered pads, platform, mount, and/or other physical connector that may emanate from the backside interior 402. The chip mount 418 may secure the control chip 416 within the interior 400 of the projector medallion 102. The chip mount 418 may provide mounting points to solidly affix the chip 416 in place while still allowing modular installation and/or removal if needed. The chip mount 418 may be adjacent to the battery compartment 204. The projector medallion 102 may comprise multiple chip mounts 418 which may enable flexibility in positioning the control chip 416 optimally among the other components within the interior 400.

The proximal support 422 may be a structural brace, rail, and/or other reinforcing/structural element mounted to the backside interior 402 of the projector medallion 102. The proximal support 422 may provide an anchoring point to firmly attach and/or position illumination components including but not limited to the optical conduit 404 and/or other electrical hardware within the interior 400. The proximal support 422 may prevent components, including but not limited to the optical conduit 404, from shifting out of alignment within the electronic necklace 100. The proximal support 422 may comprise an indentation that may substantially correlate to and/or receive a portion of the optical conduit 404.

The medial support 424 may be an additional brace, rail, and/or other reinforcing/structural element which may provide extra mounting points and/or anchors for internal illumination components of the electronic necklace 100 including but not limited to the optical conduit 404 within the interior 400. The medial support 424 may prevent components, including but not limited to the optical conduit 404, from shifting out of alignment within the electronic necklace 100. The medial support 424 may comprise the medial cutout 432 that may substantially correlate to and/or receive a portion of the optical conduit 404.

The distal support 426 may be an additional brace, rail, and/or other reinforcing/structural element which may provide extra mounting points and/or anchors for internal illumination components of the electronic necklace 100 including but not limited to the optical conduit 404 within the interior 400. The distal support 426 may prevent the optical conduit 404 from shifting out of alignment within the electronic necklace 100. The distal support 426 may comprise the distal cutout 434 that may be substantially correlated to and/or receive a portion of the optical conduit 404.

The securing bracket 428 may be a bracket, clip, joint, and/or other fastening component that may be used to affix and/or secure the optical conduit 404 to the interior 400 of the projector medallion 102. The securing bracket 428 may be attached to the optical conduit 404 at an area substantially opposite of the end 430. The securing bracket 428 may hold the optical conduit 404 in place by at least partially connecting to the projector light connector 408. The coupling between the projector light connector 408 and/or the securing bracket 428 may prevent the optical conduit 404 from coming loose over time with routine usage of the electronic necklace 100. The securing bracket 428 may supplement the proximal support 422, the medial support 424, and/or the distal support 426 by adding an additional layer of reinforcement to resist vibrations and/or impacts that could displace and/or damage the various components of the electronic necklace 100.

The end 430 may be the terminating end portion and/or tip of the optical conduit 404 that extends within the interior 400 towards the underside 116 and/or front side 112 of the projector medallion 102. The end 430 may be the illumination exit point of the optical conduit 404 where light from projector light 406 and/or other sources inside the projector medallion 102 may emerge after traveling through the length of the light canal 502 of the optical conduit 404. The structure of the end 430 may integrate the refraction means 104 to shape the light projection before and/or as the light exits the opening 114 of the projector medallion 102. The end 430 may transfer the illumination from the optical conduit 404 to the area exterior to the projection medallion 102.

The medial cutout 432 may be an indentation at and/or near the upper portion of the medial support 424. The medial cutout 432 may act as a support for the optical conduit 404. The medial cutout 432 may serve as a pathway and/or anchoring point for other components which may ensure they are correctly positioned and/or secured within the projector medallion 102. The medial cutout 432 may match the dimensions and/or shape of the optical conduit 404 which may ensure the optical conduit 404 is secured within the interior 400 of the projector medallion 102. Additionally, the medial cutout 432 may contribute to the overall weight reduction of the projector medallion 102.

The distal cutout 432 may be an indentation cut at and/or near the upper portion of the distal support 426. The distal cutout 432 may act as a support for the optical conduit 404. The distal cutout 432 of the distal support 426 may be different in shape than the medial cutout 432 of the medial support 424. The distal cutout 432 may serve as a pathway and/or anchoring point for other components which may ensure they are correctly positioned and/or secured within the projector medallion 102. The distal cutout 432 may match the dimensions and/or shape of the optical conduit 404 which may ensure the optical conduit 404 is secured within the interior 400 of the projector medallion 102. Additionally, the distal cutout 432 may contribute to the overall weight distribution of the projector medallion 102.

According to one embodiment, FIG. 4A shows the projector medallion 102 comprising various internal components. The projector medallion 102 may comprise the battery compartment 204 within the interior 400. The projector medallion 102 may comprise a power source in the form of the battery 206 which may be stored in the battery compartment 204 within the interior 400 of the projector medallion 102.

The projector medallion 102 may comprise a control chip 416. The control chip 416 may be within the interior 400 of the projector medallion 102. The control chip 416 may be adjacent to the battery compartment 204 and/or may be supported by the battery compartment 204. The control chip may be above the battery compartment 204 (e.g. further away from the backside 200 than the battery compartment 204). The control chip 416 may distribute power from the battery 206 to the wire 106, the projector light 406, and/or the medallion light 410. The control chip 416 within the interior 400 of the projector medallion 102 may be electrically connected to a battery 206 housed within the battery compartment 204. The control chip 216 may supply and/or control power to the projector light 406, the medallion light 410, and/or the plurality of necklace LEDs 604.

The projector medallion 102 may further comprise the projector light 406. The projector light 406 may be within the interior 400 of the projector medallion 102. The projector medallion 102 may further comprise the projector light connector 408. The projector light connector 408 may provide both mechanical support and/or electrical connection for the projector light 406 to the control chip 416 which may enable power transfer from the control chip 416 to the projector light 406. The projector light connector 408 may support the projector light 406 within the interior 400. The projector light connector 408 may ensure the projector light 406 is securely positioned within the interior 400 of the projector medallion 102. The projector light 406 connector may connect the projector light 406 to the control chip 416 of the projector medallion 102 and may allow for power to move from the battery 206 to the control chip 416 and then to the projector light 406.

The projector medallion 102 may further comprise the medallion light 410 within the interior 400 of the projector medallion 102. The medallion light 410 may emit light through the translucent material of the projector medallion 102 to an area exterior to the projector medallion 102. The projector medallion 102 may further comprise the medallion light connector 412 which may provide both mechanical support and/or electrical connection for the medallion light 410 to the control chip 416. The medallion light connector 412 may enable power transfer from the control chip 416 to the medallion light 410. The medallion light connector 412 may ensure the medallion light 410 is securely positioned within the interior 400 of the projector medallion 102.

The projector medallion 102 may further comprise the optical conduit 404. The optical conduit 404 may be within the interior 400 of the projector medallion 102. The optical conduit 404 may be polyhedral in shape and/or cylindrical in shape. The optical conduit 404 may comprise the emblem lens 504 (not shown) and/or the refraction means 104. The projector light 406 may be at least partially encased within the optical conduit 404 which may allow for light from the projector light 406 to travel through the light canal 502 (not shown) within the optical conduit 404 and/or subsequently pass through the emblem lens 504 and/or the refraction means 104 to the area exterior to the refraction means 104 and/or projector medallion 102 after passing through the refraction means 104. The refraction means 104 may be designed to manipulate the light path of the light from the projector light 406.

The refraction means 104 may be at an end 430 of the optical conduit 404. The refraction means 104 may be adjacent to the underside 116 of the projector medallion 102. The emblem lens 504 may be within the optical conduit 404 and/or may be positioned to receive light from the projector light 406. The emblem lens 504 may be at an area less close to the end 430 of the optical conduit 404 than the refraction means 104. The optical conduit 404 and/or the opening 114 may be substantially planar to one another. The opening 114 may allow light to project from the projector light 406, through the optical conduit 404 to an area exterior to the projector medallion 102 and/or the refraction means 104 without being obstructed by the translucent material of the projector medallion 102. The opening 114 of the projector medallion 102 may be a shape that substantially corresponds to the shape of the end 430 of optical conduit 404 and/or the refraction means 104.

The projector medallion 102 may be substantially connected to the wire 106 via the wire connector 414. The wire connector 414 may be within the medallion interior 400. The wire connector 414 may connect the wire 106 to the projector medallion 102 via the control chip 416. The wire connector 414 may be designed for mechanically and/or electrically connecting the wire 106 to the projector medallion 102 via the control chip 416. The wire connector 414 may allow for power to move from the battery 206 to control chip 416 and then to the wire 106. When connected to the wire connector 414, the wire 106 may form a necklace strand that may be worn by a user 704 around the user's 704 neck. The control chip 416 may facilitate the transmission of power from the control chip 416 to the wire 106 while ensuring the wire's 106 integration into the electrical system of the apparatus.

The projector medallion 102 may further comprise the securing bracket 428 which may be attached to the optical conduit 404 and/or may at least partially secure the optical conduit 404 within the interior 400 of the projector medallion 102 by at least partially affixing the optical conduit 404 to the projector light 406 connector.

The projector medallion 102 may further comprise the proximal support 422, the medial support 424, and/or the distal support 426, all of three of which may be attached to a backside interior 402 of the projector medallion 102. The proximal support 422, the medial support 424, and/or the distal support 426 may support the optical conduit 404 at an oblique angle to the backside interior 402. The proximal support 422 may be shorter than the medial support 424. The medial support 424 may be shorter than the distal support 426. The distal support 426 may be closer to the underside 116 of the projector medallion 102 than the medial support 424 and/or the proximal support 422. The medial support 424 may be closer to the underside 116 of the projector medallion 102 than the proximal support 422.

The multiple supports 422/424/426 may be attached to and/or emanate from the backside interior 402. The multiple supports 422/424/426 may work together to properly position the optical conduit 404. The multiple supports 422/424/426 may work together to properly position the end 430 and/or refraction means 104 such that both components align with the opening 114 and/or thus properly project the decorative projection 702.

The medial cutout 432 and/or the distal cutout 434 may be integrated into the medial support 424 and/or the distal support 426 respectively. The medial cutout 432 and/or the distal cutout 432 may position the optical conduit 404 such that the end 430 and/or the refraction means 104 are substantially planar and/or aligned with the opening 114 (not shown) of the projector medallion 100. The medial cutout 432 and/or the distal cutout 432 may encompass different shapes and/or may not be cut into the supports 424/426 at all.

Figure 4B:
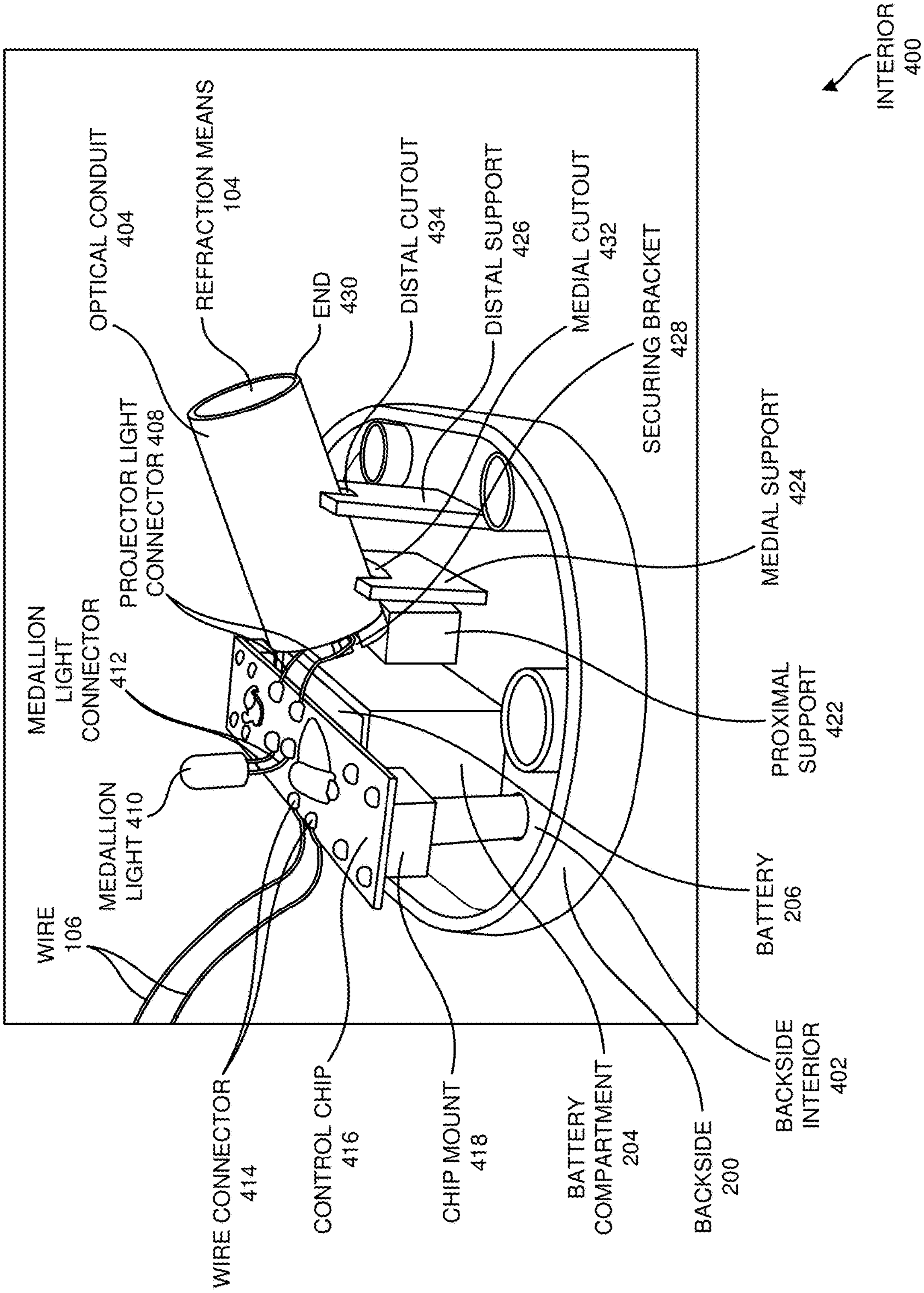
FIG. 4B is a schematic illustration of the interior of the projector medallion of the electronic necklace of FIGS. 1-4A wherein the front side of the projector medallion is removed from the backside of the projector medallion and the internal components of the projector medallion are shown assembled, according to one embodiment.

FIG. 4B is a schematic illustration of the interior 400 of the projector medallion 102 of the electronic necklace 100 of FIGS. 1-4A, wherein the front side 112 of the projector medallion 102 is removed from the backside 200 of the projector medallion 102 and the internal components of the projector medallion 102, are shown assembled, according to one embodiment.

FIG. 4B illustrates the interior 400 of the electronic necklace 100 comprising the refraction means 104, the wire 106, the backside 200, the battery compartment 204, the battery 206, the backside interior 402, the optical conduit 404, the projector light 406, the projector light connector 408, the medallion light 410, the medallion light connector 412, the wire connector 414, the control chip 416, the chip mount 418, the proximal support 422, the medial support 424, the distal support 426, the securing bracket 428, the end 430, the medial cutout 432, and the distal cutout 434.

According to one embodiment, FIG. 4B shows the optical conduit 404 which may be supported by the proximal support 422, the medial support 424, and/or the distal support 426. The proximal support 422 may be shorter than the medial support 424 and/or may be closer to the battery compartment 204 than the medial support 424. The medial support 424 may be shorter than the distal support 426 and/or may be closer to the battery compartment 204 than the distal support 426. The medial support 424 may comprise the medial cutout 432 which may receive and/or support the optical conduit 404. The distal support 426 may be closer to the underside 116 of the projector medallion 102 than the medial support 424 and/or the proximal support 422. The medial support 424 may be closer to the underside 116 of the projector medallion 102 than the proximal support 422. The distal support 426 may comprise the distal cutout 434 which may receive and/or support the optical conduit 404.

The securing bracket 428 of the optical conduit 404 may rest on the proximal support 422 and/or the medial support 424. The end 430 the optical conduit 404 may rest closest to the distal support 426. The medial cutout 432 and/or the distal cutout 432 may work together to support the optical conduit 404 which may provide a balanced and/or stable support structure for the optical conduit 404. This arrangement may ensure that the optical conduit 404 does not shift and/or tilt which may maintain the desired angle and/or position for optimal light projection.

The optical conduit 404 may be attached to the projector light connector 408 by guiding the securing bracket 428 to a substantial connection to the projector light connector 408. The securing bracket 428 may comprise a notch that may receive the projector light connector 408. By substantially connecting the to the projector light connector 408, the securing brackets 428 may ensure that the optical conduit 404 stays substantially secure within the interior 400.

Figure 5A:
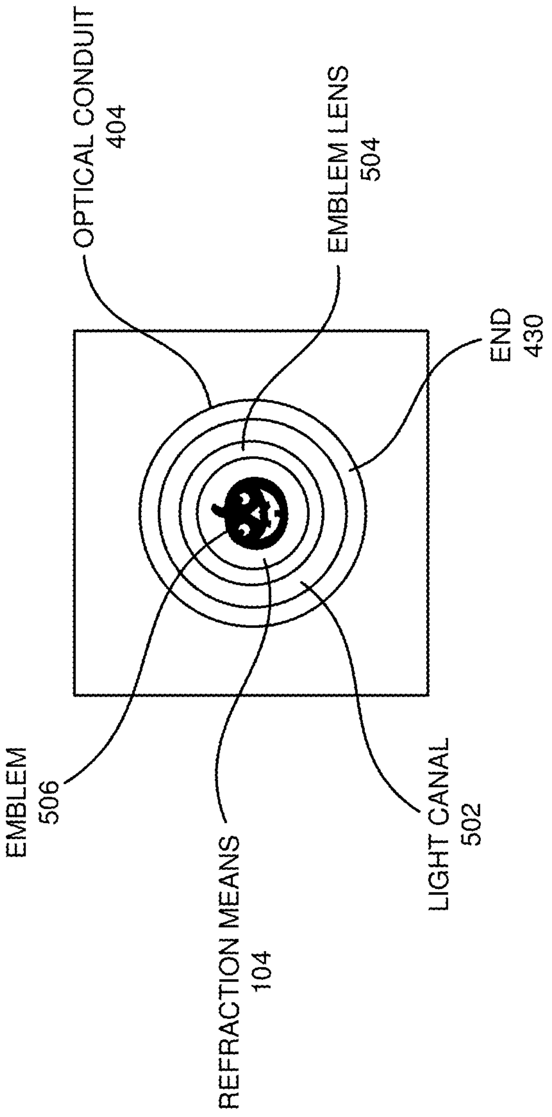
FIG. 5A is a schematic illustration of the optical conduit of the projection projector medallion of FIGS. 1-4B, according to one embodiment.

FIG. 5A is a schematic illustration of the optical conduit 404 of the projector medallion 102 of FIGS. 1-4B, according to one embodiment. FIG. 5 illustrates the optical conduit 404 of the interior 400 of the electronic necklace 100 comprising the refraction means 104, a light canal 502, an emblem lens 504, and an emblem 506.

The light canal 502 may be a hollow cavity and/or passageway within the optical conduit 404 of the projector medallion 102 which may guide and/or funnel the light projected from the projector light 406 towards through the optical conduit 404 to (and eventually through) the emblem lens 504. The interior surfaces of the light canal 502 may be highly reflective and/or mirrored to efficiently channel the light without losses along its length. The light canal 502 may provide a controlled path to direct the decorative lighting patterns from the internal components to the outer front side 112 of the projector medallion 102. The light canal 502 may comprise optics including but not limited to the emblem 506, the emblem lens 504, and/or the refraction means 104.

The emblem lens 504 may be an optical component made of transparent and/or translucent material like glass and/or plastic that is positioned at the exit point of the light canal 502 on the front side 112 of the projector medallion 102. The emblem lens 504 may comprise the emblem 506. The emblem lens 504 may receive the light funneled through the light canal 502 and/or may allow it to pass through towards the refraction means 104 while potentially providing additional focusing, diffusion, and/or filtering effects. The emblem lens 504 may magnify, invert, and/or reshape the light patterns before they become the final visible emblem illumination. The emblem lens 504 may provide a customizable optical interface to transform the raw light from the canal into the electronic necklace 100.

The emblem 506 may be a decorative visual design, logo, and/or ornamental element integrated onto the emblem lens 504 that may become illuminated and/or visible as the decorative projection 702 (not shown) when the light from the optical conduit 404 travels through the light canal 502 and/or emblem lens 504 to an area outside of the medallion 102. The emblem 506 may be etched, glued, drawn, printed, and or otherwise integrated onto the emblem lens 504 to selectively allow light to pass through the area on the emblem lens 504. Conversely, the emblem 506 may be a shape formed on the emblem lens 504 that is etched, printed, and/or otherwise formed as a clear opening on the emblem lens 504. In this configuration, the area on the emblem lens 504 surrounding the emblem 506 may be darker than the emblem 506 which may allow light in the form and/or shape of the emblem 506 to pass through the emblem lens 504 in its shape and/or form while the surrounding area remains substantially dark.

According to one embodiment, FIG. 5 shows the optical conduit 404. The optical conduit 404 may be within the interior 400 of the projector medallion 102. The optical conduit 404 may comprise the emblem lens 504 and/or the refraction means 104. The emblem lens 504 may be within the optical conduit 404 and/or may be positioned to receive light from the projector light 406. The emblem lens 504 may be at an area less close to the end 430 of the optical conduit 404 than the refraction means 104. The emblem lens 504 may comprise an emblem 506 that may be integrated onto the emblem lens 504.

When the light travels through the light canal 502, the light may pass through the emblem lens 504 and may be at least partially obstructed by the emblem 506. The emblem 506 may create the decorative projection 702 (not shown) to the area exterior to the projector medallion 102 after passing through the refraction means 104. The refraction means 104 may be designed to manipulate the light path of the light from the projector light 406. The projector light 406 may be at least partially encased within the optical conduit 404 which may allow for light from the projector light 406 to travel through the light canal 502 within the optical conduit 404 and/or subsequently pass through the emblem lens 504 and/or the refraction means 104. The refraction means 104 may be at an end 430 of the optical conduit 404 and/or may be adjacent to the underside 116 of the projector medallion 102.

Figure 5B:
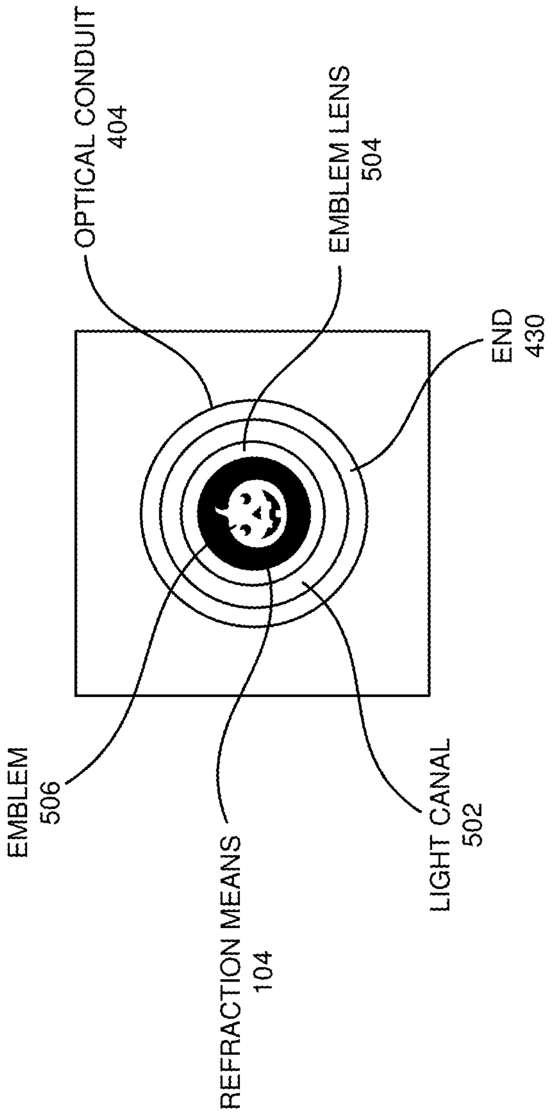
FIG. 5B is an alternative embodiment of FIG. 5A wherein the emblem is inverse of the emblem shown in FIG. 5A, according to one embodiment.

FIG. 5B is an alternative embodiment of FIG. 5A wherein the emblem 506 is inverse of the emblem 506 shown in FIG. 5A. FIG. 5B illustrates the optical conduit 404 of the interior 400 of the electronic necklace 100 comprising the refraction means 104, the light canal 502, the emblem lens 504, and the emblem 506. As shown in FIG. 5B, the emblem 506 may be oriented to allow light to pass through the emblem lens 504 in the form of a pumpkin. Converse to FIG. 5A, the emblem in FIG. 5B may block the light for the pumpkin's eyes, nose, mouth and/or exterior, whereas FIG. 5A may allow the light passing through the light canal 502 to form a mouth, eyes, nose, and/or perimeter.

Figure 6:
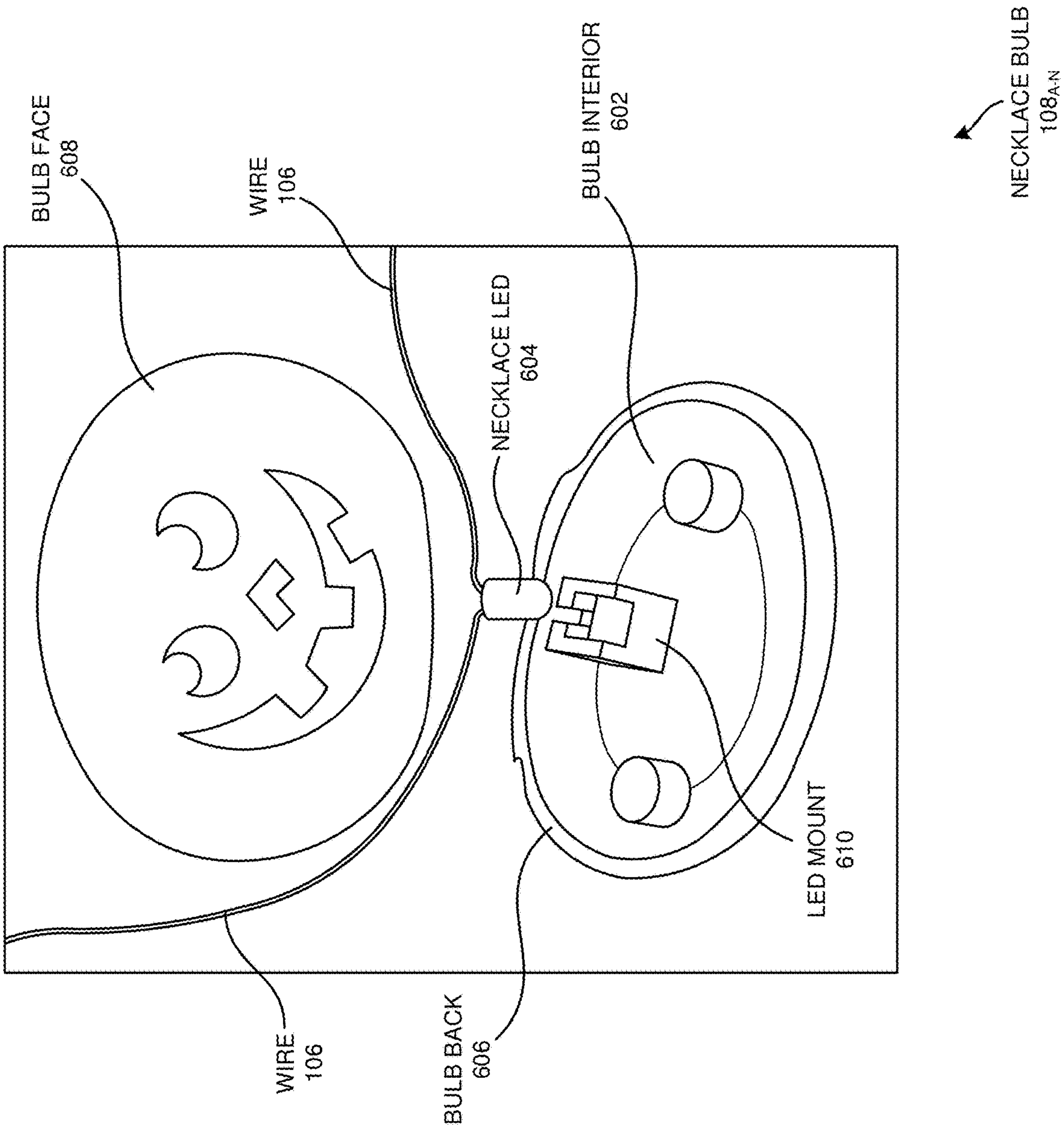
FIG. 6 is a schematic illustration of the necklace bulbs of FIGS. 1-5B wherein a bulb interior and the components of the necklace bulb are shown, according to one embodiment.

FIG. 6 is a schematic illustration of the necklace bulbs 108A-N of FIGS. 1-5B wherein a bulb interior 602 and the components of the necklace bulbs 108A-N are shown, according to one embodiment. FIG. 6 illustrates a bulb interior 602 of the necklace bulb 108A-N comprising the wire 106, a bulb interior 602, a necklace led 604, a bulb back 606, a bulb face 608, and an LED mount 610.

The bulb interior 602 may be the hollow inner cavity and/or chamber enclosed within each of the necklace bulbs 108A-N distributed along the length of the wire 106 of the electronic necklace 100. The bulb interior 602 may provide an insulated environment to house the necklace LED 604 and/or other lighting components for that individual the necklace bulb 108A-N unit. The bulb interior 602 may comprise optics, reflectors, and/or diffusion materials to shape and project the necklace LED's 604 illumination outwards through the bulb face 608 and/or bulb back 606. The bulb interior 602 may create a contained space which may separate the electronics from the outside while still enabling the light to be visible externally.

The necklace LED 604 may be a compact light emitting diode positioned within the bulb interior 602 of each individual necklace bulb 108 along the electronic necklace 100. The necklace LED 604 may be powered by receiving electricity from the wire 106. The necklace LED 604 may produce illumination that ultimately creates the decorative lighting effect emanating from the corresponding necklace bulb 108A-N. The necklace LED 604 may connect to the LED mount 610. The necklace LED 604 may connect to the control chip 416 via the wire 106 and the wire connector 414 of the projector medallion 102. The necklace LED 604 in each necklace bulb 108 may enable patterns, sequences, and/or dynamic lighting effects beyond just simple steady illumination.

The bulb back 606 may be the rear outer shell and/or surface of the necklace bulb 108 that faces inwards towards the body of the user and/or neck when the electronic necklace 100 is properly worn. The bulb back 606 may enclose and/or protect the bulb interior 602 by housing the necklace LED 604 from outside interference. The bulb back 606 may be made up of a translucent and/or opaque material that may allow for light from the necklace LED 604 to illuminate to an area exterior to the necklace bulb 108. The bulb back 606 may secure the necklace LED 604 components in place within the hollow bulb interior 602.

The bulb face 608 may be the forward-facing outer surface of the necklace bulb 108 that may be visible to outside observers when the electronic necklace 100 is properly worn by a user 704. The bulb face 608 may be constructed from a translucent and/or transparent plastic, acrylic and/or glass material which may allow for light to illuminate from the necklace LED 604 through the bulb face 608 to an area exterior to the necklace bulb 108A-N. The shape, texture, and/or optical properties of the bulb face 608 may diffuse, focus, and/or otherwise alter the raw light into a more visually appealing glow and/or effect. The bulb face 608 may comprise one or more decorative emblems and/or refraction means that may create a decorative silhouette at an area exterior to the necklace bulb 108A-N.

The LED mount 610 may be the physical attachment point, socket, and/or solder pad where the necklace LED 604 becomes integrated into the bulb interior 602 of the necklace bulb 108. The LED mount 610 may fix the necklace LED 604 in the proper orientation to project light outwards through the bulb face 608. The LED mount 610 may further anchor the necklace LED 604 to prevent it from coming loose and/or misaligning during routine usage of the electronic necklace 100.

According to one embodiment, FIG. 6 shows the bulb interior 602 of one of the necklace bulbs 108A-N. The electronic necklace 100 may comprise the plurality of necklace LEDs 604 which may be attached to the wire 106. The plurality of necklace bulbs 108A-N may be formed from a translucent material. The necklace bulbs 108A-N may comprise the bulb interior 602. The bulb interior 602 may further comprise an LED mount 610. The plurality of necklace bulbs 108A-N may encase the necklace LED(s) 604. One of the necklace LEDs 604 may be affixed within the bulb interior 602 of one of the plurality of necklace bulbs 108A-N via the LED mount 610. The plurality of necklace LEDs 604 may project light through the necklace bulbs 108A-N to an area exterior to the necklace bulb 108A-N. The necklace LEDs 604 may receive power from the battery 206 via the control chip 416 which may then direct power to the wire connector 414 which is electrically connected to the wire 106.

Figure 7:
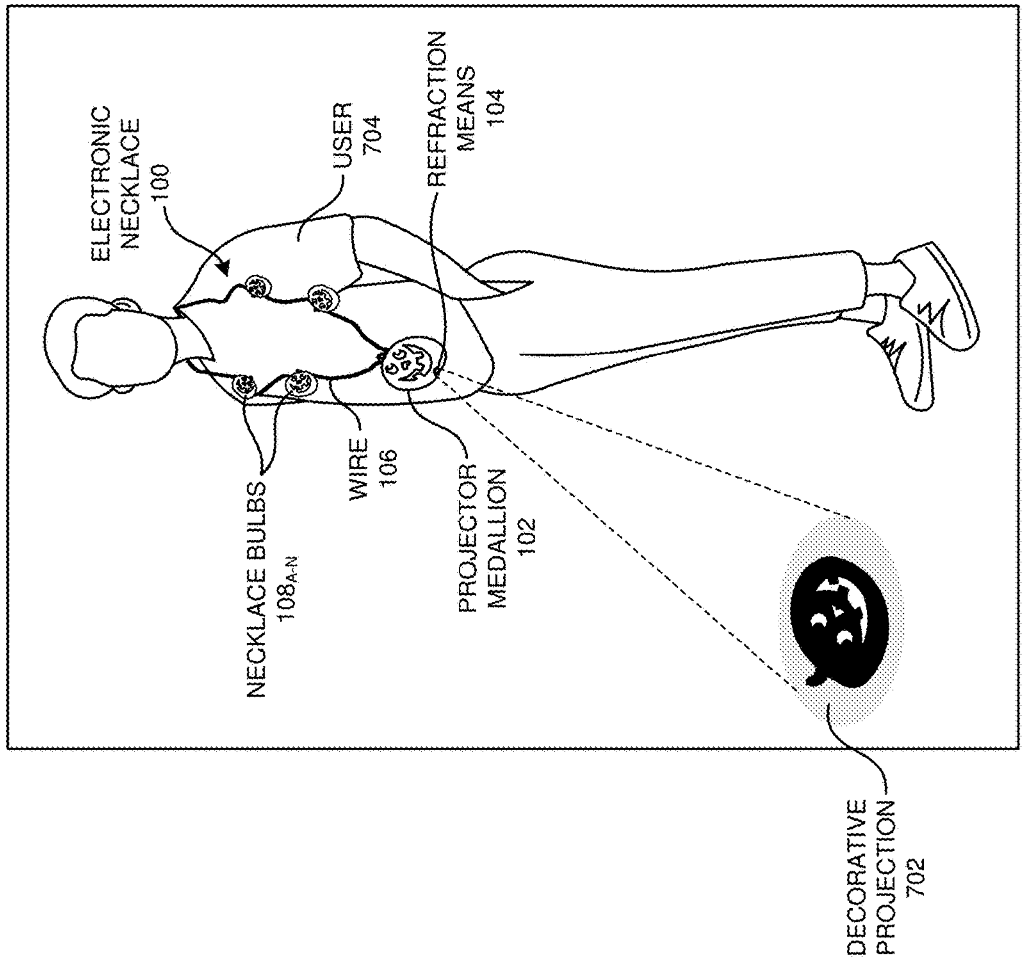
FIG. 7 is an operational view of the electronic necklace of FIGS. 1-6 wherein a user is wearing the electronic necklace and the projector medallion is projecting a decorative projection downward, according to one embodiment.

FIG. 7 is an operational view of the electronic necklace 100 of FIGS. 1-6 wherein a user 704 is wearing the electronic necklace 100 and the projector medallion 102 is projecting a decorative projection 702 downward, according to one embodiment. FIG. 7 illustrates a user 704 wearing the electronic necklace 100 wherein the projector medallion 102 is producing a decorative projection 702. FIG. 7 shows the projector medallion 102, the wire 106, the necklace bulbs 108A-N, a decorative projection 702, and a user 704.

The decorative projection 702 may be the ornamental lighting display that is produced and/or made visible on the exterior of the projector medallion 102 when the electronic necklace 100 is powered on. The decorative projection 702 may be the culminating visual effect combining the projection from the projector light 406 through the light canal 502, emblem lens 504, emblem 506, and/or refraction means 104. The decorative projection 702 may be an artistic representation that transforms the electronic necklace 100 into a wearable lighting display.

The user 704 may be the individual who is wearing the electronic necklace 100 during use. The user 704 may have the necklace around his neck using the connector 110, with the front side 112 and decorative projection 702 visible to others on the exterior surface. The backside 200 of the projector medallion 102 may comprise the button 202 and/or battery compartment 204 both of which may face inwards toward the user 704 for convenient access. The user 704 may control the lighting modes and/or effects produced in the decorative projection 702 through these interfaces on the backside 200.

According to one embodiment, FIG. 7 shows the user 704 wearing the electronic necklace 100. When wearing the electronic necklace 100, the electronic necklace 100 may be turned on, which may allow for a decorative protection 702 to emanate from the projection medallion 102. The decorative projection 702 may form on the ground area near the user 704 and/or may move as the user 704 and/or the electronic necklace 100 may move. The necklace bulbs 108A-N may also be emanating light from the necklace LED(s) 604.

Figure 8:
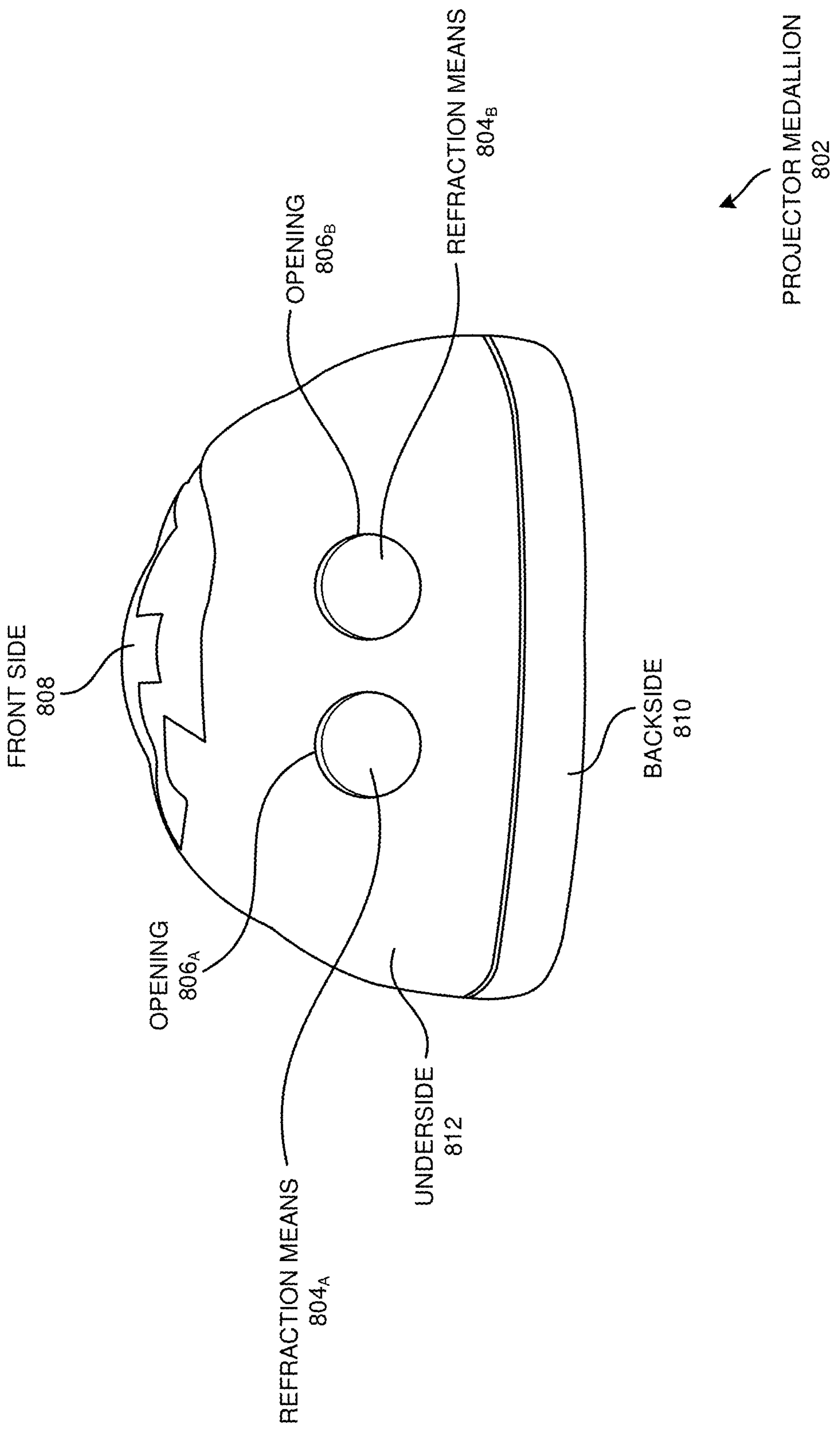
FIG. 8 shows an underside view of an alternative embodiment of the electronic necklace of FIGS. 1-7 wherein the projector medallion comprises two projectors, according to one embodiment.

FIG. 8 shows an underside view of an alternative embodiment of the electronic necklace 100 of FIGS. 1-7 wherein the projector medallion 802 comprises two projectors, according to one embodiment. FIG. 8 illustrates the projector medallion 802 comprising a refraction means 804A, a refraction means 804B, an opening 806A, an opening 806B, a backside 810, a front side 808, and an underside 812.

According to one embodiment, FIG. 8 shows the front side 808 of the projector medallion 802 which may be connected to the backside 810. The front side 808 may be connected to the backside 810 by various means including but not limited to glue, screws, magnets, and/or rivets. The underside 812 may be a subcomponent of the front side 808. The projector medallion 802 may further comprise the opening 806A and/or the opening 806B both of which may be cut into the translucent material. The refraction means 804A may be adjacent to the opening 806A. The refraction means 804B may be adjacent to the opening 806B. The opening 806A and/or the opening 806B may be cut into the front side 808 at and/or near the underside 812. Each individual optical conduit of the plurality of optical conduits 904A/904B (not shown) may be substantially planar to one of the plurality of openings 806A/806B. Each individual optical conduit 904A/904B (not shown) of the plurality of optical conduits 904A/904B (not shown) may house at least one of the plurality projector lights 906A/906B (not shown). The openings 806A and/or 806B may allow light to project from the projector light 906A and 906B (not shown) to an area exterior to the projector medallion 802 which may occur without being obstructed by the translucent material. The openings 806A and/or 806B may be shaped to substantially correspond to the shape of the end (not shown) of the optical conduit 904A and 904B (not shown) and/or the refraction means 804A and/or 804A.

Figure 9A:
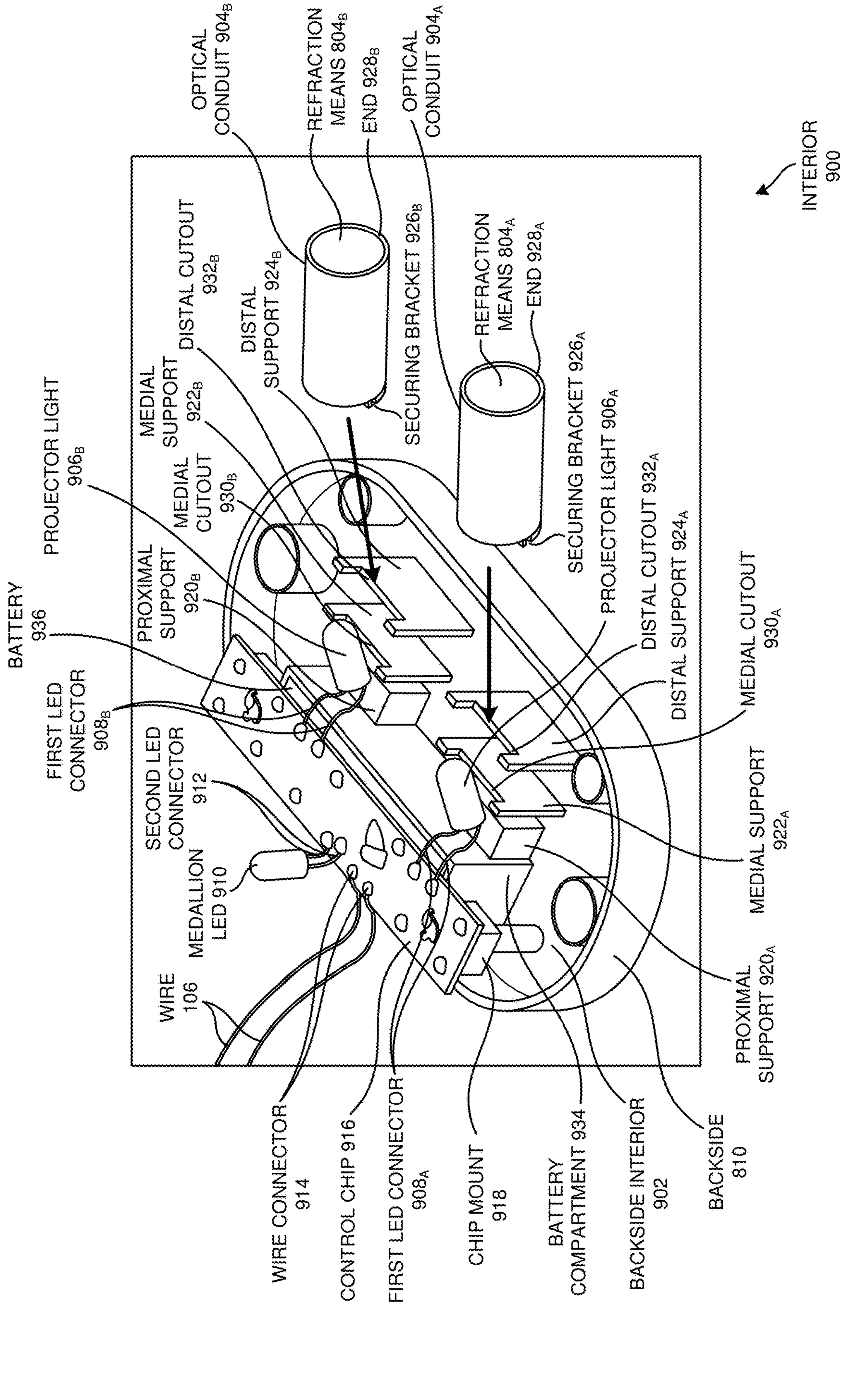
FIG. 9A is a disassembled view of the projector medallion of the electronic necklace of FIG. 8 wherein the front side of the projector medallion is removed from the backside of the projector medallion and the internal components of an interior of the projector medallion are shown, according to one embodiment.

FIG. 9A is a disassembled view of the projector medallion 802 of the electronic necklace 100 of FIG. 8 wherein the front side 808 of the projector medallion 802 is removed from the backside 810 of the projector medallion 802 and the internal components of an interior 900 of the projector medallion 802 are shown, according to one embodiment.

FIG. 9A illustrates an interior 900 of the electronic necklace 100 comprising the, the wire 106, refraction means 804A, the refraction means 804B, the backside 810, a backside interior 902, an optical conduit 904A, an optical conduit 904B, a projector light 906A, a projector light 906B, a first LED connector 908A, a first LED connector 908B, a medallion LED 910, a second LED connector 912, a wire connector 914, a control chip 916, a chip mount 918, a proximal support 920A, a proximal support 920B, a medial support 922A, a medial support 922B, a distal support 924A, a distal support 924B, a securing bracket 926A, a securing bracket 926B, an end 928A, an end 928B, a medial cutout 930A, a medial cutout 930B, a distal cutout 932A, a distal cutout 932B, a battery compartment 934, and a battery 936.

According to one embodiment, FIG. 9A shows the projector medallion 802 which may comprise the battery compartment 934 within the interior 900. A power source in the form of the battery 936 may be stored in the battery compartment 934 within the interior 900. The control chip 916 may be within the interior 900 and/or adjacent to the battery compartment 934. The control chip 916 may be supported by the battery compartment 934 and/or positioned above the battery compartment 934 (e.g. further away from the backside 810). The control chip 916 may distribute power from the battery 936 to the wire 106, the medallion LED 910, the projector lights 906A and 906B and/or other components. The medallion LED 910 may be within the interior 900 and may emit light through the translucent material of the projector medallion 802 to the exterior. The second LED connector 912 may provide mechanical support and/or electrical connection between the medallion LED 910 and the control chip 916.

For the first decorative projection 1006 (not shown), the projector medallion 802 may comprise the projector light 906A which may be connected to the control chip 916 via the first LED connector 908A. The projector medallion 802 may also include an optical conduit 904A which may comprise the refraction means 804A at the end 928A, each of which may be aligned with an opening 806A. The optical conduit 904A may be supported by the proximal support 920A, medial support 922A, and/or the distal support 924A at an oblique angle to the backside interior 902. The securing bracket 926A may secure the optical conduit 904A to the second LED connector 912.

For the second decorative projection 1008 (not shown), the projector medallion 802 may comprise the projector light 906B which may be connected to the control chip 916 via the first LED connector 908B. The projector medallion 802 may also include the optical conduit 904B which may comprise the refraction means 804B at the end 928B, each of which may be aligned with the opening 806B. The optical conduit 904B may be supported by the proximal support 922B, medial support 922B, and/or distal support 924B at an oblique angle to the backside interior 902. The securing bracket 926B may secure the optical conduit 904B to the first LED connector 908B.

The optical conduits 904A and 904B may be a channel and/or waveguide that guides and/or directs the light emitted by the projector lights 906A/906B towards the refraction means 804A/804B. The optical conduits 904A/904B may comprise a light canal that may further shape and/or collimates the light before it enters the refraction means 804A/804B. The refraction means 804A/804B may be attached to the optical conduits 904A/904B which may act as the final optical element(s) to refract and/or project the light in the desired pattern and/or shape away from the projector medallion 802. Additionally, an emblem lens (not shown) and/or an emblem (not shown) may be integrated within the optical conduits 904A/904B and/or the refraction means 804A/804B. The emblem lens(es) may be a secondary lens element that further refracts or focuses the light as it passes the optical conduits 904A/904B. The emblem may be an etched, engraved, or textured surface that imparts the specific decorative pattern or design onto the projected light.

The wire connector 914 may connect the wire 106 to the control chip 916 which may allow power to move from the battery 936 to the control chip 916 to the wire 106. The control chip 916 may further move power to the medallion LED 910, and/or projector lights 906A and 906B. The medial cutouts 930A and 930B and/or distal cutouts 932A and 932B may be integrated into their respective and/or corresponding supports to properly position the optical conduits 904A and 904B which may align the refraction means 804A and 804B with the openings 806A and 806B for projecting decorative patterns.

Figure 9B:
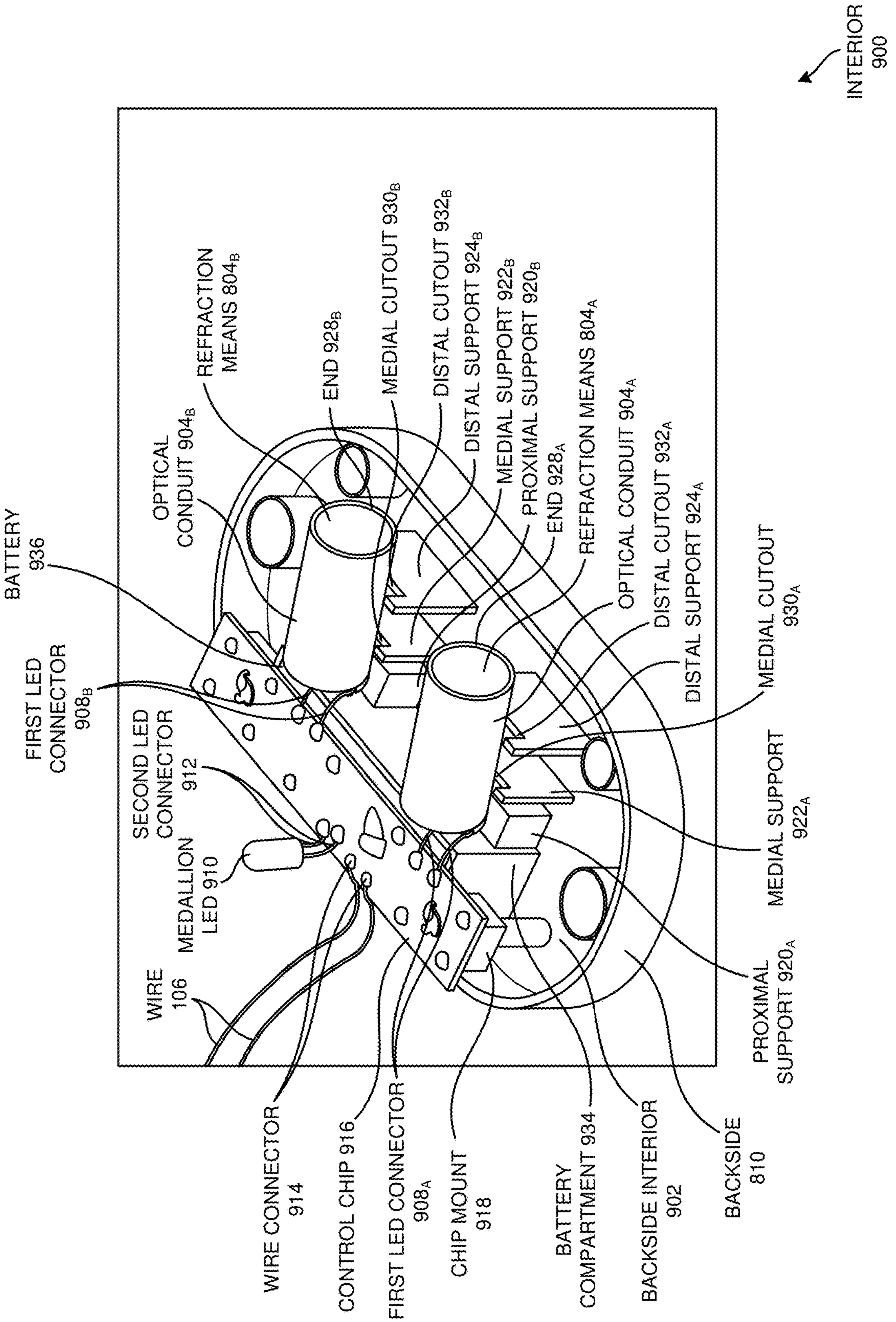
FIG. 9B is a schematic illustration of the interior of the projector medallion of the electronic necklace of FIGS. 8-9A wherein the front side of the projector medallion is removed from the backside of the projector medallion and the internal components of the projector medallion are shown assembled, according to one embodiment.

FIG. 9B is a schematic illustration of the interior of the projector medallion 802 of the electronic necklace 100 of FIGS. 8-9A wherein the front side 808 of the projector medallion 802 is removed from the backside 810 of the projector medallion 802 and the internal components of the projector medallion 802 are shown assembled, according to one embodiment.

FIG. 9B illustrates an interior 900 of the electronic necklace 100 comprising the wire 106, the refraction means 804A, the refraction means 804B, the backside 810, the backside interior 902, the optical conduit 904A, the optical conduit 904B, the projector light 906A, the projector light 906B, the first LED connector 908, the medallion LED 910, the second LED connector 912, the wire connector 914, the control chip 916, the chip mount 918, the first LED connector 908B, the proximal support 920A, the proximal support 920B, the medial support 922A, the medial support 922B, the distal support 924A, the distal support 924B, the securing bracket 926A, the securing bracket 926B, the end 928A, the end 928B, the medial cutout 930A, the medial cutout 930B, the distal cutout 932A, the distal cutout 932B, the battery compartment 934, and the battery 936.

According to one embodiment, FIG. 9B shows the optical conduits 904A/904B which may be supported by the proximal supports 920A/920B, the medial supports 922A/922A, and/or the distal supports 924A/924B respectively. The proximal supports 920A/920B may be shorter than the medial supports 922A/922B and may be closer to the battery compartment 934. The medial supports 922A/922B may be shorter than the distal support 924A/924B and may be closer to the battery compartment 934 than the distal supports 924A/924B. The medial supports 922A/922B may comprise the medial cutouts 930A/930B. The medial cutouts 930A/930B may receive and/or support the optical conduits 904A/904B. The distal supports 924A/924B may be closer to the underside 812 of the projector medallion 802 than the medial supports 922A/922B and the proximal supports 920A/920B. The medial supports 922A/922B may be closer to the underside 812 than the proximal supports 920A/920B. The securing brackets 926A/926B of the optical conduits 904A/904B may rest on the proximal supports 920A/920B and/or the medial supports 922A/922B. The ends 928A/928B of the optical conduits 904A/904B may rest closest to the distal supports 924A/924B. The medial cutouts 930A/930B and/or the distal cutouts 932A/932B may work together to support the optical conduits 904A/904B, which may provide a balanced and stable support structure.

As shown in FIG. 9B, the optical conduit 904A may be attached to the first LED connector 908A by guiding the securing bracket 926A to a substantial connection to the first LED connector 908A. Similarly, the optical conduit 904B may be attached to the first LED connector 908B by guiding the securing bracket 926B to a substantial connection to the first LED connector 908B. The securing brackets 926A/926B may comprise notches that may receive the respective first LED connectors 908A/908B. By substantially connecting to the LED connectors 908A/908B, the securing brackets 926A/926B may ensure that the optical conduits 904A/904B stay substantially secure within the backside interior 902.

The proximal support 920A may be placed at one edge of the battery compartment 934 and/or the proximal support 920B may be placed at the other edge of the battery compartment 204. Both proximal supports 920A and 920B may be placed at a sufficient distance from each other. This overall arrangement with the supports at different levels (proximal 920A/920B, medial 922A/922B, distal 924A/924B) and/or cutouts (medial 930A/930B cutouts and distal 932A/932B cutouts) may allow the optical conduits 904A/904B to be securely held in the desired angle and/or position for optimal light projection from the projector lights 906A/906B through the optical conduits 904A/904B to the area outside of the projector medallion 802.

Figure 10A:
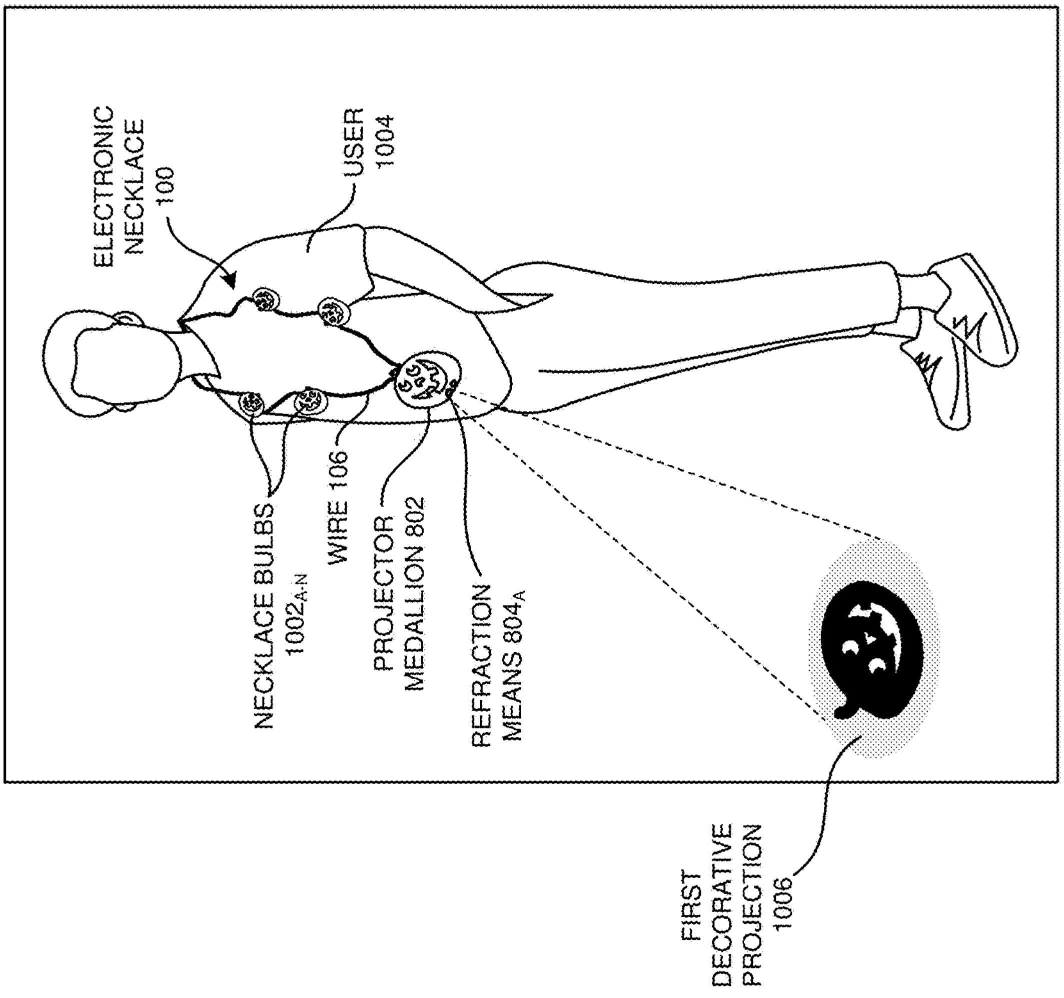
FIG. 10A is an operational view of the electronic necklace of FIGS. 8-9B wherein a user is wearing the electronic necklace and the projector medallion is projecting a first decorative projection downward, according to one embodiment.

FIG. 10A is an operational view of the electronic necklace 100 of FIGS. 8-9B wherein a user 1004 is wearing the electronic necklace 100 and the projector medallion 802 is projecting a first decorative projection 1006 downward, according to one embodiment. FIG. 10A illustrates a user 1004 wearing the electronic necklace 100 wherein the projector medallion 802 may produce the first decorative projection 1006. FIG. 10A shows the projector medallion 802, the wire 106, the necklace bulbs 1002A-N, a first decorative projection 1006, and a user 1004.

According to one embodiment, FIG. 10A shows the user 1004 wearing the electronic necklace 100. When wearing the electronic necklace 100, the electronic necklace 100 may be turned on, which may allow for a first decorative projection 1006 to emanate from the projector medallion 802 of the refraction means 804A. The first decorative projection 1006 may form on the ground area near the user 1004 and may move as the user 1004 and/or the electronic necklace 100 moves. The necklace bulbs 1002A-N may also be emanating light from the necklace LEDs.

Figure 10B:
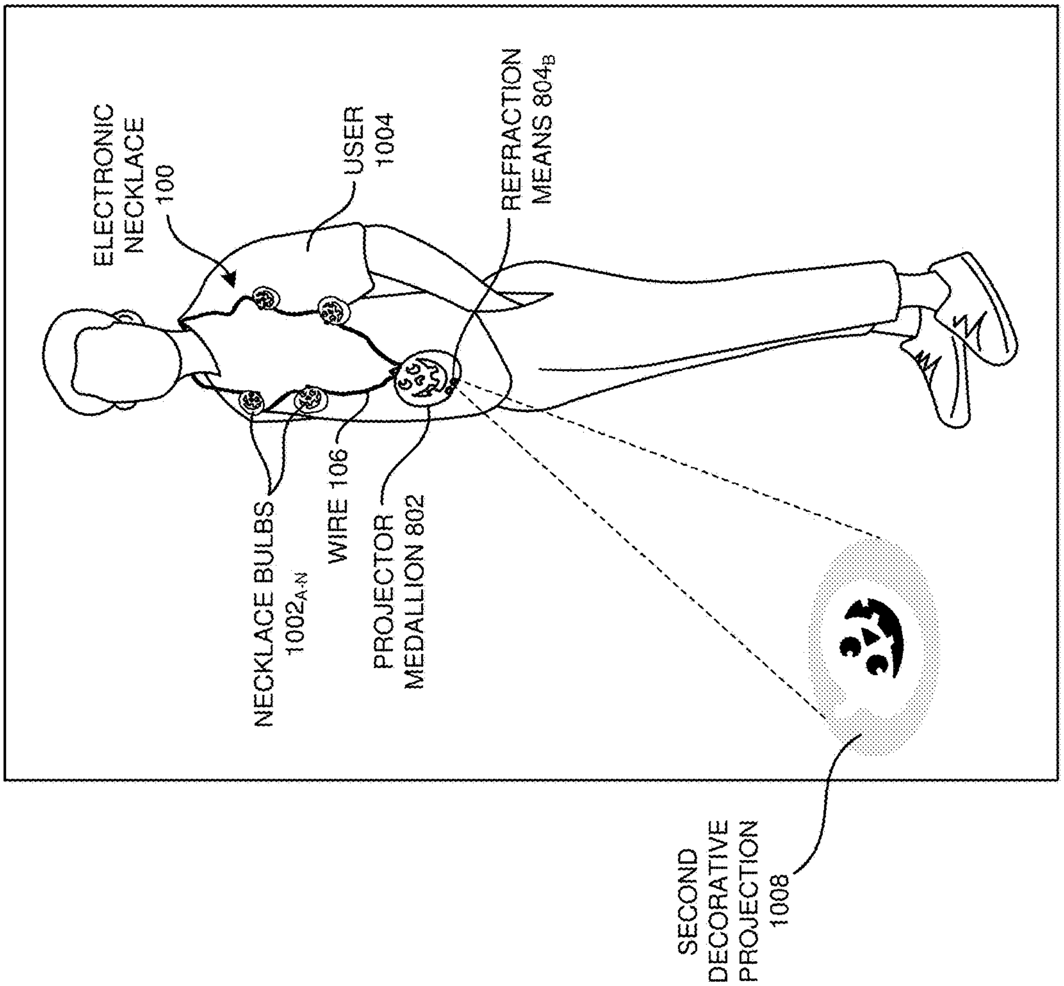
FIG. 10B is an operational view of the electronic necklace of FIGS. 8-9B wherein the user is wearing the electronic necklace and the projector medallion is projecting a second decorative projection downward, according to one embodiment.

FIG. 10B is an operational view of the electronic necklace of FIGS. 8-9B wherein the user 1004 is wearing the electronic necklace 100 and the projector medallion 802 is projecting a second decorative projection 1008 downward, according to one embodiment. FIG. 10B illustrates the user 1004 wearing the electronic necklace 100 wherein the projector medallion 802 may produce the second decorative projection 1008. FIG. 10B shows the projector medallion 802, the wire 106, the necklace bulbs 1002A-N, a second decorative projection 1008, and the user 1004.

According to one embodiment, FIG. 10A shows the user 1004 wearing the electronic necklace 100. When wearing the electronic necklace 100, the electronic necklace 100 may be turned on, which may allow for a second decorative projection 1008 to emanate from the projector medallion 802 of the refraction means 804B. The second decorative projection 1008 may form on the ground area near the user 1004 and may move as the user 1004 and/or the electronic necklace 100 moves. The necklace bulbs 1002A-N may also be emanating light from the necklace LEDs.

As shown in FIG. 10A and FIG. 10B, In the FIG. 10A, the first decorative projection 1006 may be visible, indicating that the refraction means 804A may be actively projecting light from the projector light 906A and/or creating a visual pattern and/or image on a surface and/or area in front of the user 1004. Conversely, in FIG. 10B, the second decorative projection 1008 may be visible, suggesting that the refraction means 804B may be actively projecting light from the projector light 906B, while the refraction means 804A may be inactive and/or turned off. The decorative projections 1006 and 1008 may be directed downward, potentially projecting onto a surface and/or area below the user's 1004 line of sight, including but not limited to tabletop and/or the ground. This downward projection direction may be intentional which may allow the user 1004 to easily view and appreciate the decorative projections 1006 and 1008 without having to look up and/or strain their neck.

The ability to switch between the first decorative projection 1006 and the second decorative projection 1008 may be controlled by the control chip 916 within the projector medallion 802. The control chip 916 may be programmed to alternate between activating projector lights 906A/906B, or it may be user-controlled, allowing the wearer to switch between the decorative projections 1006/1008 as desired. The necklace bulbs 1002A-N may also contribute to the overall decorative effect, either by illuminating and/or by providing a decorative shape or design along the necklace strand, complementing the decorative projections 1006 and/or 1008 from the projector medallion 802.

Figure 11A:
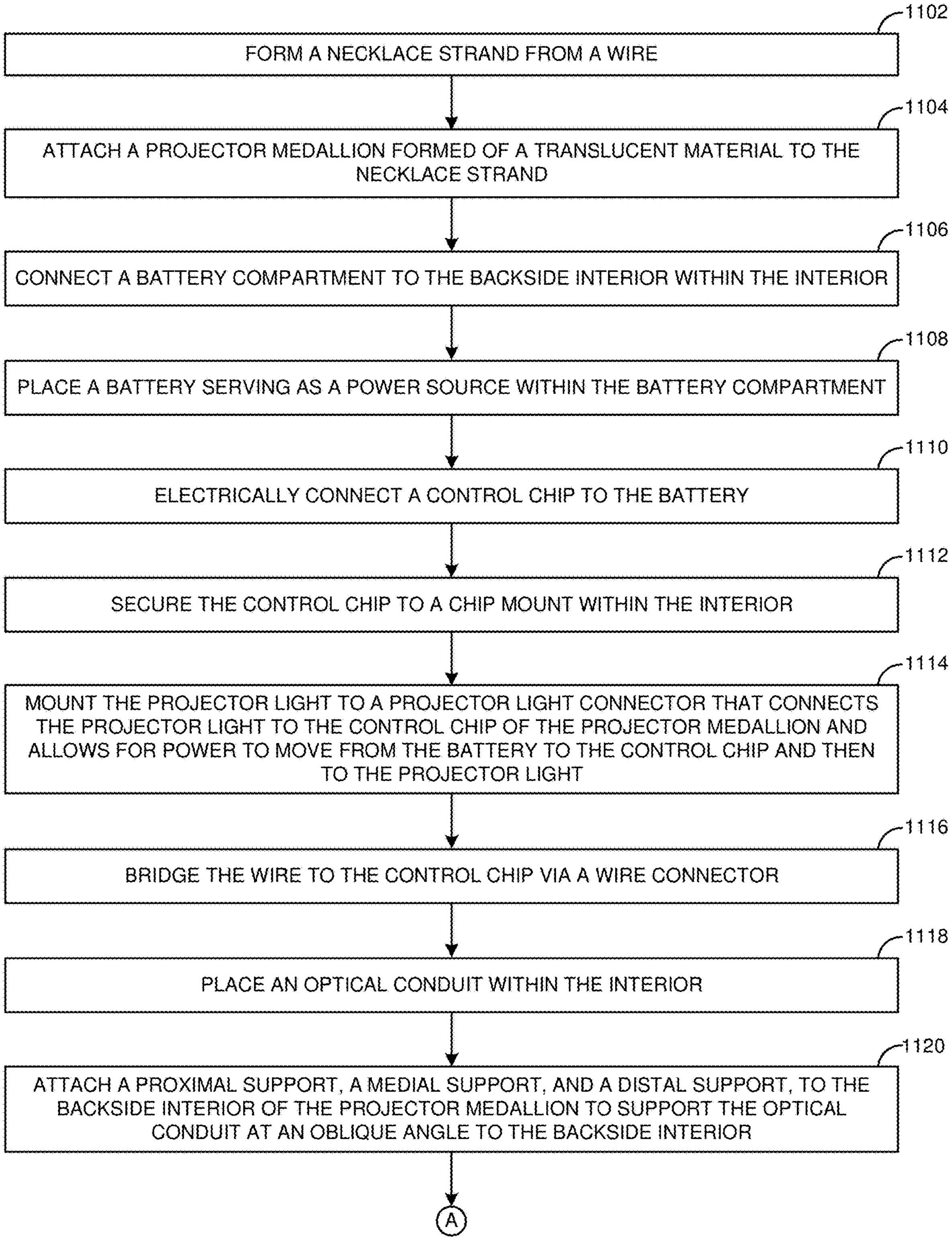
FIG. 11 is a process flow diagram describing a method of manufacturing the electronic necklace of FIGS. 1-10B, according to one embodiment.
Figure 11B:
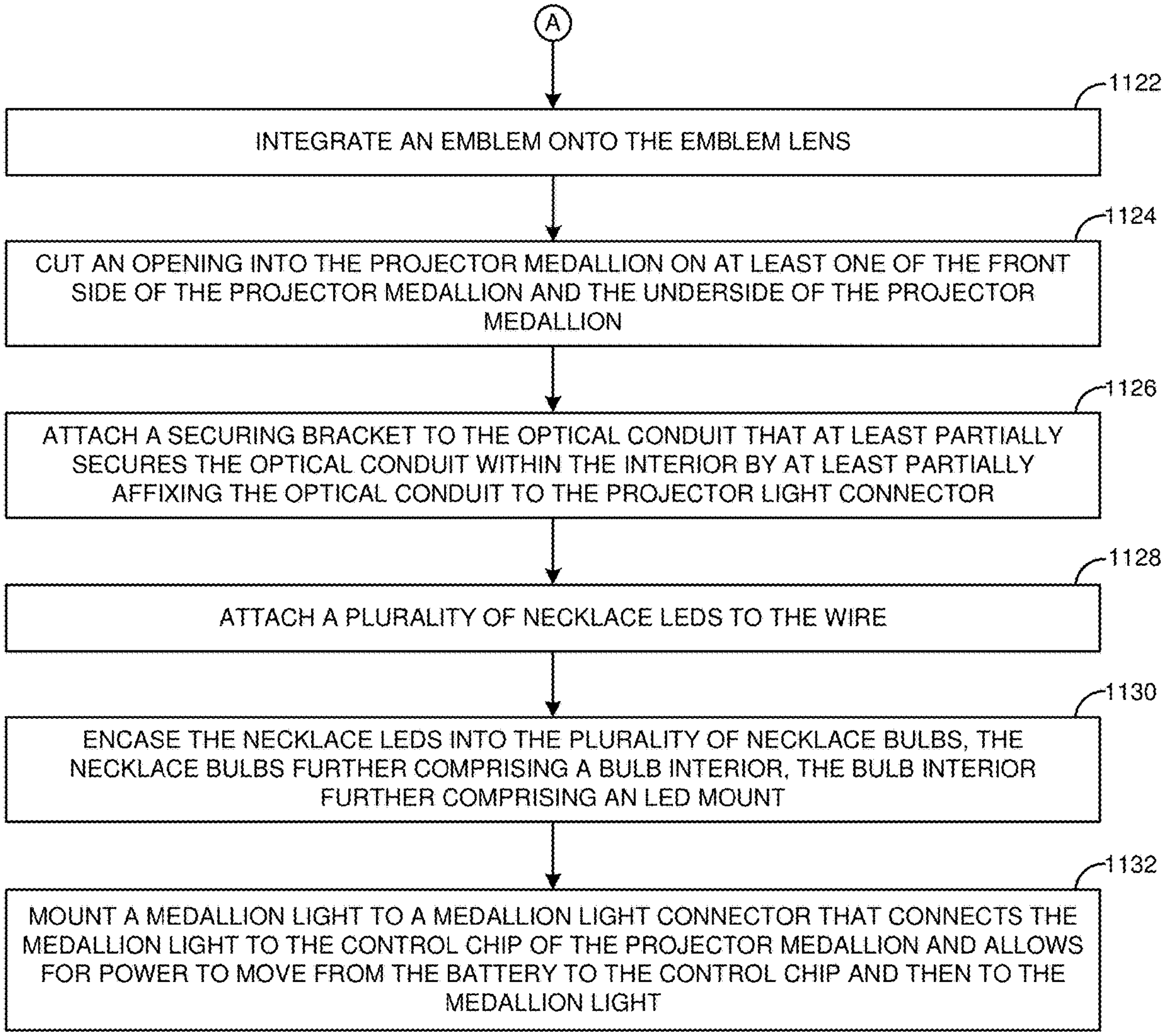

FIG. 11 is a process flow diagram describing a method of manufacturing the electronic necklace of FIGS. 1A-10B, according to one embodiment. In operation 1102, a necklace strand may be formed from a wire. In operation 1104, a projector medallion may be formed of a translucent material may be attached to the necklace strand. In operation 1106, a battery compartment may be connected to the backside interior within the interior. In operation 1108, a battery serving as a power source may be placed within the battery compartment. In operation 1110, a control chip may be electrically connected to the battery. In operation 1112, the control chip may be secured to a chip mount within the interior. In operation 1114, the projector light may be mounted to a projector light connector that connects the projector light to the control chip of the projector medallion and allows for power to move from the battery to the control chip and then to the projector light.

In operation 1116, the wire may be bridged to the control chip via a wire connector. In operation 1118, an optical conduit may be placed within the interior. In operation 1120, a proximal support, a medial support, and a distal support may be attached to the backside interior of the projector medallion to support the optical conduit at an oblique angle to the backside interior. In operation 1122, an emblem may be integrated onto the emblem lens. In operation 1124, an opening may be cut into the projector medallion on at least one of the front side of the projector medallion and the underside of the projector medallion. In operation 1126, A securing bracket may be attached to the optical conduit that at least partially secures the optical conduit within the interior by at least partially affixing the optical conduit to the projector light connector. In operation 1128, a plurality of necklace LEDs may be attached to the wire. In operation 1130, the necklace LEDs may be encased into the plurality of necklace bulbs, the necklace bulbs further comprising a bulb interior, the bulb interior further comprising an LED mount. In operation 1132, a medallion light may be mounted to a medallion light connector that connects the medallion light to the control chip of the projector medallion and allows for power to move from the battery to the control chip and then to the medallion light.

Walking at night in the dark may be inherently dangerous, but it may be even more so on holiday nights. On holidays such as Halloween and New Years, drivers may be more likely to be under the influence and pedestrians may be more likely to be dressed in dark, hard-to-see clothing. Despite the considerable risks and dangers involved with walking in public on Halloween and New Years, children continue to dress in dark costumes and ignore the need for personal visual indicators. Children, while dressed in their Halloween attire, often fail to obey traffic and/or pedestrian laws and ordinances. Children may also often fail to use common sense such as looking both ways before crossing a road and/or using a crosswalk. These failures may result not only from a lack of knowledge of laws and the rules of the road, but also from the excitement that holiday festivities may bring. Children may be playing with friends, searching for their next house to trick-or-treat at, and/or running around aimlessly as a result of their elevated blood sugar.

As a result of failing to properly obey the rules of the road and/or use common walking sense, children may become the victim of traffic accidents. The embodiments of FIGS. 1A-10B may remedy the risks involved with Halloween and New Years night and help to protect children from themselves and from the hidden dangers around them. The embodiments of FIGS. 1A-10B produce lighting that may be seen by those driving automobiles, which may increase the likelihood the child is seen by the driver which may decrease the likelihood of an accident. The embodiments of FIGS. 1A-10B may enable children and pedestrians to supplant the use of items such as hand held flash lights, headlamps, reflective vests, and/or reflective headwear. The embodiments of FIGS. 1A-10B may enable users to have free hands while using the device, which may enable them to participate in other activities more easily.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

The invention claimed is:

1. An apparatus comprising:
- a wire serving as a necklace strand;
- a projector medallion formed of a translucent material comprising a backside, a front side, an underside, and an interior,
  - wherein the projector medallion is connected to the necklace strand;
- a power source in the form of a battery within the interior of the projector medallion;
- a projector light within the interior of the projector medallion;
- a control chip within the interior of the projector medallion that controls power from the battery to the projector light;

an optical conduit within the interior of the projector medallion comprising an emblem lens and a refraction means designed to manipulate the light emanating from the projector light,
wherein the projector light is at least partially encased within the optical conduit to allow light to travel through a light canal within the optical conduit and pass through the emblem lens and the refraction means,
wherein the refraction means is at an end of the optical conduit and is adjacent to the underside of the projector medallion,
wherein the emblem lens is within the optical conduit and is positioned to receive light from the projector light,
an emblem integrated onto the emblem lens; and
an opening of the projector medallion cut into the projector medallion,
wherein the refraction means is adjacent to the opening,
wherein the optical conduit and the opening are substantially planar to one another, and
wherein the opening allows light to project from the projector light to an area exterior to the refraction means without being obstructed by the translucent material of the projector medallion.

2. The apparatus of claim 1 further comprising:
a medallion light within the interior of the projector medallion,
wherein the medallion light emits light through the translucent material of the projector medallion to the area exterior to the projector medallion.

3. The apparatus of claim 1 further comprising:
a wire connector designed for mechanically and electrically connecting the wire to the projector medallion via the control chip, thereby facilitating the transmission of power from the control chip to the wire while ensuring the wire's integration into the electrical system of the apparatus.

4. The apparatus of claim 1 further comprising:
a projector light connector that provides both mechanical support and electrical connection for the projector light to the control chip, enabling power transfer from the control chip to the projector light and ensuring the projector light is securely positioned within the interior of the projector medallion.

5. The apparatus of claim 2 further comprising:
a medallion light connector that provides both mechanical support and electrical connection for the medallion light to the control chip, enabling power transfer from the control chip to the medallion light and ensuring the medallion light is securely positioned within the interior of the projector medallion.

6. The apparatus of claim 4 further comprising:
a securing bracket attached to the optical conduit that at least partially secures the optical conduit within the interior of the projector medallion by at least partially affixing the optical conduit to the projector light connector.

7. The apparatus of claim 1 further comprising:
a proximal support, a medial support, and a distal support attached to a backside interior of the projector medallion to support the optical conduit at an oblique angle to the backside interior,
wherein the proximal support is shorter than the medial support,
wherein the medial support is shorter than the distal support,
wherein the medial support comprises a medial cutout to receive and support the optical conduit,
wherein the medial support is closer to the underside of the projector medallion than the proximal support,
wherein the distal support is closer to the underside of the projector medallion than the medial support and the proximal support, and
wherein the distal support comprises a distal cutout to receive and support the optical conduit.

8. The apparatus of claim 1 further comprising:
a plurality of necklace LEDs attached to the wire,
wherein the plurality of necklace LEDs receive power from the battery via the wire connector and the wire.

9. The apparatus of claim 1 wherein the optical conduit is polyhedral in shape.

10. The apparatus of claim 1 wherein the optical conduit is cylindrical in shape.

11. The apparatus of claim 1 wherein when the light travels through the light canal, the light passes through the emblem lens and is at least partially obstructed by the emblem thereby creating a decorative projection to the area exterior to the projector medallion after passing through the refraction means.

12. An apparatus comprising:
a wire serving as a necklace strand;
a projector medallion formed of a translucent material comprising a backside, a front side, an underside, and an interior,
wherein the projector medallion is substantially connected to the wire;
a battery compartment within the interior of the medallion;
a battery serving as a power source within the battery compartment;
a control chip within the interior of the projector medallion that is electrically connected to the battery and controls power to a plurality of projector lights,
wherein the plurality of projector lights are positioned within the interior,
a plurality of projector light connectors that connect the plurality of projector lights to the control chip of the projector medallion and allows for power to move from the battery to the control chip and then to the plurality of projector lights,
wherein the plurality of projector light connectors support the plurality of projector lights within the interior;
a wire connector that connects the wire to the projector medallion via the control chip,
wherein the wire connector allows for power to move from the battery to the control chip and then to the wire;
a plurality of optical conduits within the interior, each of which comprising a light canal, an emblem lens, and a refraction means,
wherein each individual optical conduit houses at least one of the plurality projector lights,
an emblem integrated onto each emblem lens,
wherein when the light travels through the light canal of the plurality of optical conduits, the light passes through the emblem lens and is at least partially obstructed by the emblem creating a decorative projection at an area exterior to the projector medallion after passing through the refraction means;
a plurality of openings of the projector medallion on at least one of the front side of the projector medallion and the underside of the projector medallion, wherein each individual refraction means is adjacent to at least one of the openings, wherein each individual optical conduit of the plurality of optical conduits is substantially planar to one of the plurality of openings, and wherein each of the plurality of openings allow light to project from the plurality of projector lights to the area exterior to the projector medallion without being obstructed by the translucent material of the projector medallion.

13. The apparatus of claim 12 further comprising:

a medallion light that is positioned within the interior and emits light through the translucent material of the projector medallion to the area exterior to the projector medallion, wherein the medallion light is electrically connected to the battery.

14. The apparatus of claim 13 further comprising:

a medallion light connector that connects the medallion light to the control chip of the projector medallion and allows for power to move from the battery to the control chip and then to the medallion light, wherein the medallion light connector supports the medallion light within the interior.

15. The apparatus of claim 12 further comprising:

a plurality of necklace LEDs that are attached to the wire, wherein the plurality of necklace LEDs are electrically connected to the battery via the necklace strand.

16. The apparatus of claim 12 further comprising:

a securing bracket attached to the plurality of optical conduits that at least partially secures the plurality of optical conduits within the interior by at least partially affixing the plurality of optical conduits to the plurality of projector light connectors.

17. The apparatus of claim 12 further comprising:

a plurality of proximal supports, a plurality of medial supports, and a plurality of distal supports attached to a backside interior of the projector medallion to support the plurality of optical conduits at an angle oblique to the backside interior, wherein the plurality of proximal supports are shorter than the plurality of medial supports and are closer to the battery compartment than the plurality of medial supports, wherein the plurality of medial supports are shorter than the plurality of distal supports and are closer to the battery compartment than the plurality of distal supports, wherein each of the plurality of medial supports comprise a medial cutout to receive and support at least one of the plurality of optical conduits, wherein the plurality of distal supports are closer to the underside of the projector medallion than the plurality of medial supports and the plurality of proximal supports, wherein the plurality of medial supports are closer to the underside of the projector medallion than the plurality of proximal supports, and Wherein each of the plurality of distal supports comprise a distal cutout to receive and support at least one of the plurality of optical conduits.

18. The apparatus of claim 12 further comprising:

a plurality of necklace LEDs attached to the wire, wherein the necklace LEDs receive power from the battery via the control chip which then directs power to the wire connector which is electrically connected to the wire.

19. The apparatus of claim 12 further comprising:

a plurality of necklace bulbs encasing the necklace LEDs, the necklace bulbs further comprising a bulb interior, the bulb interior further comprising an LED mount, wherein the plurality of necklace bulbs are formed from the translucent material, wherein one of the plurality of necklace LEDs is affixed within the bulb interior of one of the plurality of necklace bulbs via the LED mount, and wherein the plurality of necklace LEDs project light through the necklace bulbs to the area exterior to the bulb.

20. A method comprising:

forming a necklace strand from a wire, wherein the wire is capable of transmitting an electrical current;

attaching a projector medallion formed of a translucent material to the necklace strand, wherein the projector medallion comprises a backside, a front side, an underside, and an interior, wherein the backside comprises a backside interior that faces the interior of the projector medallion;

connecting a battery compartment to the backside interior within the interior;

placing a battery serving as a power source within the battery compartment, wherein the battery is accessible through the backside;

electrically connecting a control chip to the battery, wherein the control chip is within the interior of the projector medallion;

securing the control chip to a chip mount within the interior, wherein the chip mount is attached to the backside interior and is adjacent to the battery compartment, wherein the control chip controls power from the battery to a projector light, and wherein the projector light is positioned within the interior of the medallion;

mounting the projector light to a projector light connector that connects the projector light to the control chip of the projector medallion and allows for power to move from the battery to the control chip and then to the projector light, wherein the projector light connector supports the projector light within the interior;

bridging the wire to the control chip via a wire connector, wherein the wire connector mounts the wire to the projector medallion at the control chip to form the necklace strand, wherein the wire connector allows for power to move from the battery to the control chip and then to the wire;

placing an optical conduit within the interior, wherein the optical conduit comprises a light canal, an emblem lens, and a refraction means, wherein the optical conduit is at least one of polyhedral in shape and cylindrical in shape, wherein the projector light is at least partially encased within the optical conduit, wherein light from the projector light travels through the light canal of the optical conduit and passes through the emblem lens and the refraction means to an area exterior to the refraction means, wherein the refraction means is at an end of the optical conduit and is adjacent to the underside of the projector medallion, and wherein the emblem lens is within the optical conduit at an area less close to the end of the optical conduit than the refraction means;

attaching a proximal support, a medial support, and a distal support, to the backside interior of the projector medallion to support the optical conduit at an oblique angle to the backside interior, wherein the proximal support is shorter than the medial support, wherein the medial support is shorter than the distal support, wherein the medial support comprises a medial cutout to receive and support the optical conduit, wherein the medial support is closer to the underside of the projector medallion than the proximal support, wherein the distal support is closer to the underside of the projector medallion than the medial support and the proximal support, and wherein the distal support comprises a distal cutout to receive and support the optical conduit, integrating an emblem onto the emblem lens, wherein when the light travels through the light canal, the light passes through the emblem lens and is at least partially obstructed by the emblem creating a decorative projection at the area exterior to the projector medallion after passing through the refraction means;

cutting an opening into the projector medallion on at least one of the front side of the projector medallion and the underside of the projector medallion, wherein the refraction means is adjacent to the opening, wherein the optical conduit and the opening are substantially planar to one another, wherein the opening of the projector medallion is a shape that substantially corresponds to the shape of the end of optical conduit and the refraction means, and wherein the opening allows light to project from the projector light to an area exterior to the projector medallion without being obstructed by the translucent material of the projector medallion.

21. The method of 20 further comprising:

attaching a securing bracket to the optical conduit that at least partially secures the optical conduit within the interior by at least partially affixing the optical conduit to the projector light connector.

22. The method of 21 further comprising:

attaching a plurality of necklace LEDs to the wire, wherein the necklace LEDs receive power from the battery via the wire connector and the wire.

23. The method of claim 22 further comprising:

encasing the necklace LEDs into the plurality of necklace bulbs, the necklace bulbs further comprising a bulb interior, the bulb interior further comprising an LED mount, wherein the plurality of necklace bulbs are formed from the translucent material, wherein one of the plurality of necklace LEDs is affixed within the bulb interior of one of the plurality of necklace bulbs via the LED mount, and wherein the plurality of necklace LEDs project light through the necklace bulbs to the area exterior to the bulb.

24. The method of claim 23 further comprising:

mounting a medallion light to a medallion light connector that connects the medallion light to the control chip of the projector medallion and allows for power to move from the battery to the control chip and then to the medallion light, wherein the medallion light connector supports the medallion light within the interior.

* * * * *